US012659493B2

(12) United States Patent
Shen et al.

(10) Patent No.: US 12,659,493 B2
(45) Date of Patent: Jun. 16, 2026

(54) METHODS AND APPARATUS TO REDUCE LATENCY DURING VIEWPORT SWITCHING IN IMMERSIVE VIDEO

(71) Applicant: Intel Corporation, Santa Clara, CA (US)

(72) Inventors: Gang Shen, Hillsboro, OR (US); Guangxin Xu, Shanghai (CN); Jill Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/571,714

(22) PCT Filed: Oct. 6, 2021

(86) PCT No.: PCT/CN2021/122510
§ 371 (c)(1),
(2) Date: Dec. 18, 2023

(87) PCT Pub. No.: WO2023/056574
PCT Pub. Date: Apr. 13, 2023

(65) Prior Publication Data
US 2024/0236337 A1 Jul. 11, 2024

(51) Int. Cl.
*H04N 19/167* (2014.01)
*H04N 13/178* (2018.01)
(Continued)

(52) U.S. Cl.
CPC ......... *H04N 19/167* (2014.11); *H04N 13/178* (2018.05); *H04N 13/194* (2018.05);
(Continued)

(58) Field of Classification Search
CPC .. H04N 19/167; H04N 19/119; H04N 19/172; H04N 19/597; H04N 13/178; H04N 13/194; H04N 13/366
See application file for complete search history.

(56) References Cited

U.S. PATENT DOCUMENTS 10,999,583 B2 *  5/2021  Tourapis .......... H04N 21/44004
2017/0347084 A1  11/2017  Boyce
(Continued)

FOREIGN PATENT DOCUMENTS

CN      108702503 A    10/2018
CN      111355954 A    6/2020
(Continued)

OTHER PUBLICATIONS

He, Yong et al., "AHG8: On adaptive resolution change constraint" Joint Video Experts Team (JVET) of ITU-T SG 16 WP 3 and ISO/IEC JTC 1/SC 29/WVG 11 15th Meeting: Gothenburg, SE, Jul. 3-12, 2019, JVET-00184, Jul. 12, 2019 (Jul. 12, 2019), 3 pages.
(Continued)

*Primary Examiner* — Kyle M Lotfi
(74) *Attorney, Agent, or Firm* — Hanley, Flight & Zimmerman, LLC

(57)  ABSTRACT

Methods, apparatus, systems, and articles of manufacture are disclosed to reduce latency during viewport switching in immersive video. An example apparatus include at least one memory, instructions in the apparatus, and processor circuitry to execute the instructions to: obtain a first bitstream having a first encoded frame and a second encoded frame, the second encoded frame encoded at a higher resolution than the first encoded frame and having a coding dependency on the first encoded frame, rewrite the first bitstream into a second bitstream based on field of view information, the second bitstream including a third encoded frame indicative of a portion of the second encoded frame that corre-
(Continued)

sponds to the field of view information and including the first encoded frame, and transmit the second bitstream to a client device for decoding and rendering the portion of the second encoded frame.

20 Claims, 10 Drawing Sheets

(51) Int. Cl.

| | | |
|---|---|---|
| *H04N 13/194* | (2018.01) | |
| *H04N 13/366* | (2018.01) | |
| *H04N 19/119* | (2014.01) | |
| *H04N 19/172* | (2014.01) | |
| *H04N 19/597* | (2014.01) | |

(52) U.S. Cl.
CPC ......... *H04N 13/366* (2018.05); *H04N 19/119* (2014.11); *H04N 19/172* (2014.11); *H04N 19/597* (2014.11)

(56) References Cited

U.S. PATENT DOCUMENTS

| | | | | |
|---|---|---|---|---|
| 2018/0213202 | A1 | 7/2018 | Kopeinigg et al. | |
| 2018/0310010 | A1* | 10/2018 | Hourunranta | .......... H04N 19/34 |
| 2021/0227231 | A1 | 7/2021 | Hannuksela | |
| 2021/0383590 | A1* | 12/2021 | Roimela | .............. H04N 19/597 |

FOREIGN PATENT DOCUMENTS

| | | |
|---|---|---|
| WO | 2018097669 A1 | 5/2018 |
| WO | 2020141248 A1 | 7/2020 |

OTHER PUBLICATIONS

International Searching Authority, "Written Opinion of the International Searching Authority," issued in connection with International Application No. PCT/CN2021/122510, mailed on Jul. 6, 2022, 4 pages.
International Searching Authority, "International Search Report," issued in connection with International Application No. PCT/CN2021/122510, mailed on Jul. 6, 2022, 4 pages.

* cited by examiner

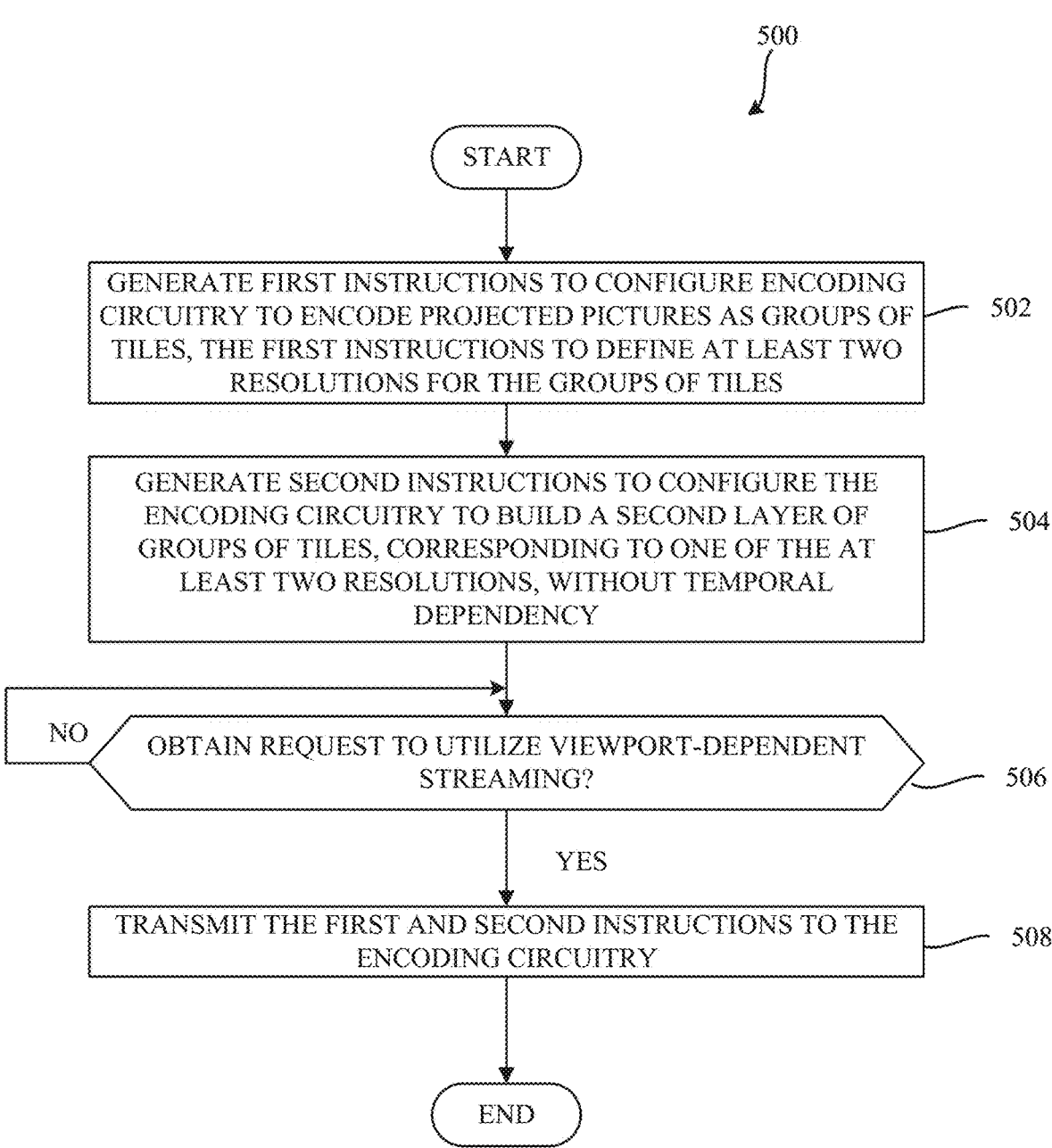

*500*

START

GENERATE FIRST INSTRUCTIONS TO CONFIGURE ENCODING CIRCUITRY TO ENCODE PROJECTED PICTURES AS GROUPS OF TILES, THE FIRST INSTRUCTIONS TO DEFINE AT LEAST TWO RESOLUTIONS FOR THE GROUPS OF TILES    502

GENERATE SECOND INSTRUCTIONS TO CONFIGURE THE ENCODING CIRCUITRY TO BUILD A SECOND LAYER OF GROUPS OF TILES, CORRESPONDING TO ONE OF THE AT LEAST TWO RESOLUTIONS, WITHOUT TEMPORAL DEPENDENCY    504

NO    OBTAIN REQUEST TO UTILIZE VIEWPORT-DEPENDENT STREAMING?    506

YES

TRANSMIT THE FIRST AND SECOND INSTRUCTIONS TO THE ENCODING CIRCUITRY    508

END

START

OBTAIN A FIRST BITSTREAM HAVING ONE OR MORE ENCODED FRAMES — 602

OBTAIN FIELD OF VIEW INFORMATION — 604

REWRITE FIRST BITSTREAM INTO A SECOND BITSTREAM BASED ON FIELD OF VIEW INFORMATION — 606

TRANSMIT THE SECOND BITSTREAM TO CLIENT DEVICE — 608

END

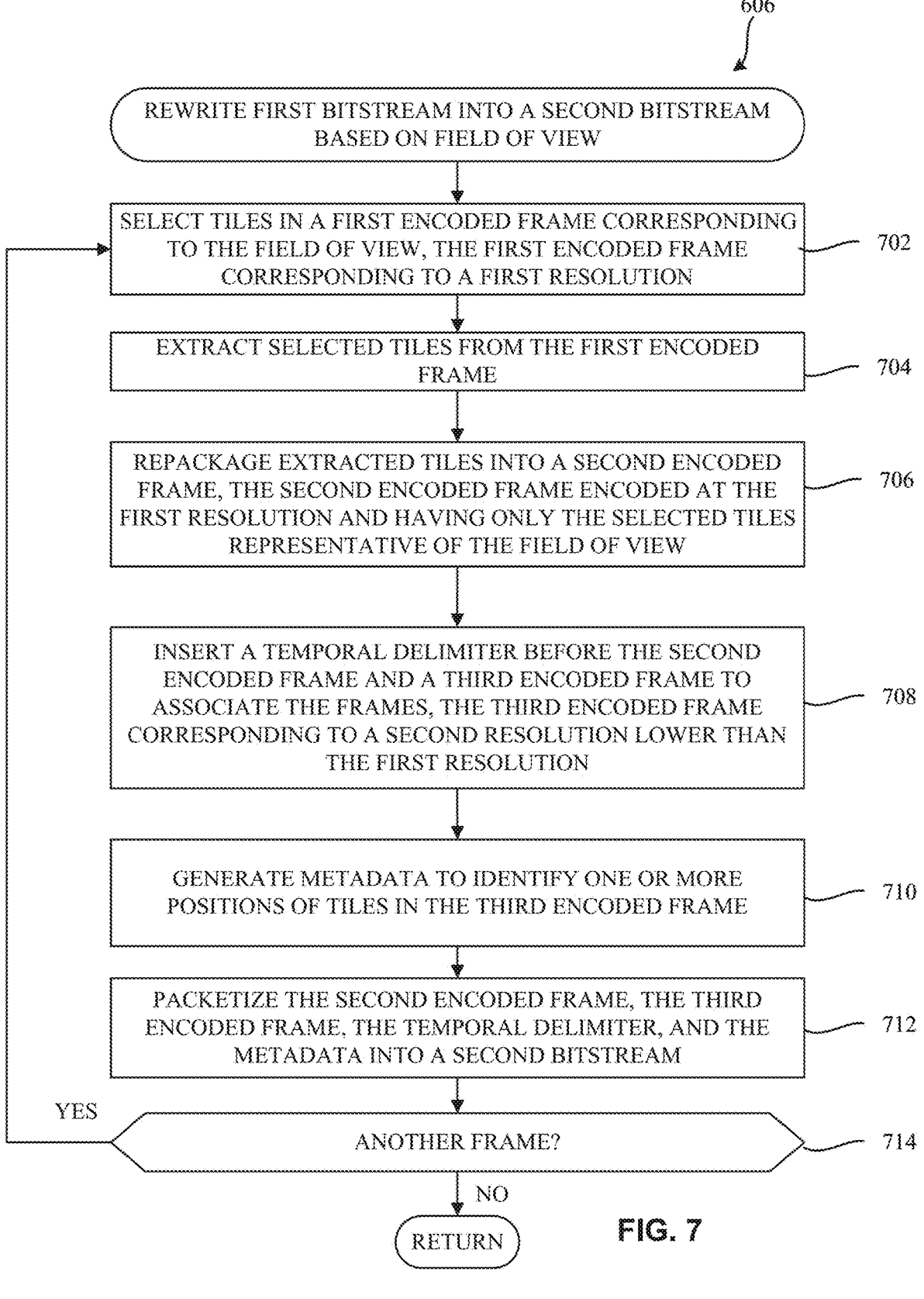

606

REWRITE FIRST BITSTREAM INTO A SECOND BITSTREAM BASED ON FIELD OF VIEW

SELECT TILES IN A FIRST ENCODED FRAME CORRESPONDING TO THE FIELD OF VIEW, THE FIRST ENCODED FRAME CORRESPONDING TO A FIRST RESOLUTION — 702

EXTRACT SELECTED TILES FROM THE FIRST ENCODED FRAME — 704

REPACKAGE EXTRACTED TILES INTO A SECOND ENCODED FRAME, THE SECOND ENCODED FRAME ENCODED AT THE FIRST RESOLUTION AND HAVING ONLY THE SELECTED TILES REPRESENTATIVE OF THE FIELD OF VIEW — 706

INSERT A TEMPORAL DELIMITER BEFORE THE SECOND ENCODED FRAME AND A THIRD ENCODED FRAME TO ASSOCIATE THE FRAMES, THE THIRD ENCODED FRAME CORRESPONDING TO A SECOND RESOLUTION LOWER THAN THE FIRST RESOLUTION — 708

GENERATE METADATA TO IDENTIFY ONE OR MORE POSITIONS OF TILES IN THE THIRD ENCODED FRAME — 710

PACKETIZE THE SECOND ENCODED FRAME, THE THIRD ENCODED FRAME, THE TEMPORAL DELIMITER, AND THE METADATA INTO A SECOND BITSTREAM — 712

YES

ANOTHER FRAME? — 714

NO

RETURN

FIG. 7

METHODS AND APPARATUS TO REDUCE LATENCY DURING VIEWPORT SWITCHING IN IMMERSIVE VIDEO

RELATED APPLICATION

This patent arises from the national stage of International Application No. PCT/CN2021/122510, which was filed on Oct. 6, 2021. International Application No. PCT/CN2021/122510 is hereby incorporated herein by reference in its entirety. Priority to International Application No. PCT/CN2021/122510 is hereby claimed.

FIELD OF THE DISCLOSURE

This disclosure relates generally to immersive video and, more particularly, to methods and apparatus to reduce latency during viewport switching in immersive video.

BACKGROUND

In video compression/decompression (codec) systems, compression efficiency and video quality are important performance criteria. For example, visual quality is an important aspect of the user experience in many video applications. Compression efficiency impacts the amount of memory needed to store video files and/or the amount of bandwidth needed to transmit and/or stream video content. A video encoder typically compresses video information so that more information can be sent over a given bandwidth or stored in a given memory space or the like. The compressed signal or data is then decoded by a decoder that decodes or decompresses the signal or data for display to a user. In most examples, higher visual quality with greater compression is desirable.

BRIEF DESCRIPTION OF THE DRAWINGS

FIG. 5 is a flowchart representative of example machine readable instructions that may be executed by example processor circuitry to implement the distribution server of FIGS. 1 and 3 to generate instructions that are to configure encoding circuitry to encode video in a particular manner.

FIGS. 6 and 7 are flowcharts representative of example machine readable instructions that may be executed by example processor circuitry to implement the distribution server of FIGS. 1 and 3 to rewrite bitstreams for viewport-dependent streaming.

The figures are not to scale. In general, the same reference numbers will be used throughout the drawing(s) and accompanying written description to refer to the same or like parts.

Figure 1:
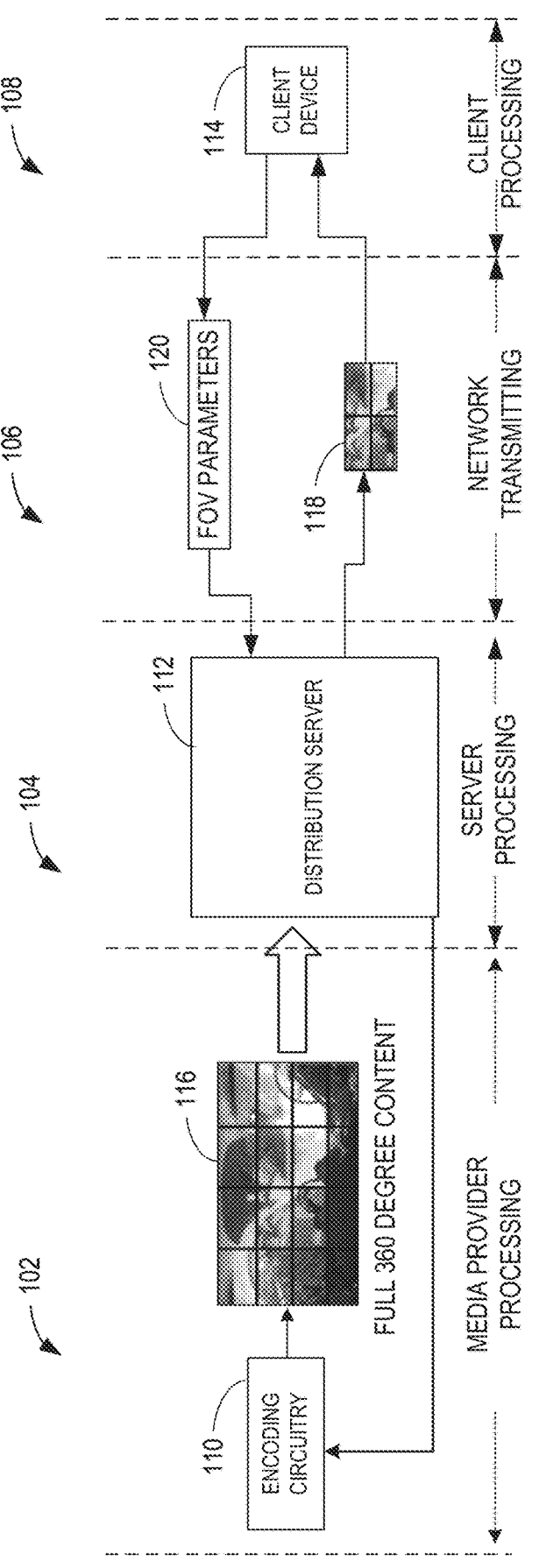
FIG. 1 is a block diagram of an example video coding process and a viewport-dependent distribution process to deliver immersive video in a time-sensitive manner.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Immersive video coding, such as high-resolution virtual reality (VR) and 360-degree video streaming (e.g., 8K or 12K planar video, 360-degree video, VR, AR, etc.), has become common with increasing Internet capacity. In some examples, immersive video coding utilizes high bandwidth. An immersive video is a video that supports a plurality of views per frame, with the plurality of views corresponding to different positions, orientations, etc. When immersive video is displayed, many different views corresponding to the immersive video are provided to a display. For example, in a 360 degree video, a rendering system (e.g., a client) can obtain a bitstream corresponding to a 360 degree video and output views that correspond to the orientation of the display (e.g., as a display corresponding to a 90 degree window rotates, views corresponding to the 90 degree window based on the rotation are displayed so that the rendering system can view the entire 360 degree video in the 90 degree window by rotating the device around the 360 degree landscape). In some examples, instead of providing a totality of views in the immersive video to the client, only content within a particular field of view (FOV) is provided and displayed (e.g., a viewport). Streaming of the particular content associated with a FOV is referred to as viewport-dependent streaming. Viewport-dependent streaming may be utilized to save bandwidth (e.g., by only streaming views to be displayed without streaming views that are not displayed).

The Moving Picture Experts Group (MPEG) developed an Omnidirectional Media Format (OMAF) that defines a video format and a packing method for viewport-dependent streaming. This format enables an omnidirectional media application, focusing on 360 degree video, images, and audio, as well as associated timed text, supporting three degrees of freedom. One approach used in OMAF viewport-dependent streaming is tile-based viewport-dependent streaming. Tile-based viewport-dependent streaming encodes projected pictures as several tiles. In OMAF, a projected picture is a result of an omnidirectional projection format that is applied at a content production side to generate 2-D pictures from a stitched sphere signal. In OMAF, two types of projection formats are utilized: equirectangular projection (ERP) and cubemap projection (CMP). In CMP, the sphere signal is rectilinearly projected into six square faces that are laid out to form a rectangle with a 3:2 ratio of width versus height, with some of the faces rotated to maximize continuity across face edges. Before tile-based viewport-dependent streaming encoding, region-wise packing (RWP) occurs on the projection picture. In RWP, the projected picture is resized, repositioned, rotated, and/or vertically/horizontally rotated prior to encoding. In some examples, when a projection picture is generated, the FOV is highlighted, selected, noted, etc., on the projection. In some examples, the FOV is not uniform on a projection picture. For example, the FOV can be scattered in multiple unconnected regions on a projection picture. In such examples, it may be challenging for an encoder and/or decoder to encode/decode the viewport for viewport-dependent streaming.

During encoding, the projected picture is segmented into tiles that can be merged into a bitstream and decoded with a single decoder instance. In some examples, a two dimensional (2-D) video codec, such as High Efficiency Video Coding (HEVC), is utilized to define tile sizes and exploit a spatial and temporal redundancy of geometry and texture components of the tiles and/or projected picture. As used herein, a tile is an isolated region which depends only on a collocated isolated region in the projected picture and does not depend on any other picture regions. In some examples, several versions of the tiles are encoded at different bitrates and/or resolutions. For example, a projected picture may be encoded in two separate layers, where each layer has the same tiles but may correspond to different bitrates and/or resolutions. Coded tile sequences are made available for streaming together with metadata describing a location of the tile on the omnidirectional video.

The viewport-dependent streaming operates based on an interactivity between client and server. For example, the client sends a viewport to the server and the server responds to the client with the content for the given viewport. The interactivity between the client and server is to occur within a short amount time in order to give a smooth viewport switch and/or content switch experience. If the interactivity does not occur within a short amount of time, users of the client may see blurred, misplaced, and/or outdated content. As used herein, content may be any type of media content, such as streaming media content, broadcast media content, 360 degree video content, etc.

In some examples, temporal dependency in video encoding can affect the speed and/or smoothness of interactivity between client and server. For example, when a new viewport is received at the server side, the server has to pack and transport the new content to the client. For such an operation to occur quickly, the encoding (e.g., packing) is to occur at key frames in the content, where the key frames have little to no temporal dependency on previous frames. In HEVC, temporal dependency is typically exploited and utilized for efficient encoding and, therefore, the server utilizes more time to encode new content, increasing latency of the interactivity between client and server. Furthermore, the packing operation is to be applied to a part, section, sections, etc., of the content (e.g., for viewport-dependent streaming). Therefore, due to temporal dependency and the specificity of the which content to encode, it may become challenging for the server to timely encode and transport the new content.

Some approaches to overcome the latency issue of viewport-dependent streaming have been developed. One of these methods include identifying a margin around the content of FOV. A disadvantage about this margin method is that only slow viewport changes are covered by the method. In some examples, methods include implementing a smaller Group of Picture (GOP) in encoding. A GOP is a group of pictures which have no dependency on any other frames outside the group and can be independently decoded. A disadvantage of the smaller GOP method is that a smaller GOP may cause bitrate increase even when viewport is not changing. Some methods include implementing multiple streams, such as low-resolution streams for a full view and high-resolution streams for content in FOV. A disadvantage of the multiple streams method includes requiring Region-wise Packing (RWP) for high-resolution streams and encoding before sending out to clients. Some methods include implementing multiple streams (e.g., one low-resolution stream and multiple high-resolution streams for content in FOV). The high-resolution streams may have different GOP size. For example, the high-resolution stream may utilize a long GOP size when viewport is not changing and a short GOP size when a viewport is changing. The disadvantage of this method is that encoding these multiple streams requires more computational effort and complex switching logic.

In the conventional methods used to overcome the latency issue of viewport-dependent streaming, temporal dependency is reduced but at the cost of increased bandwidth, redundant data, etc. For example, in the methods mentioned above, a server must wait for a start of a GOP to make a viewport switch so that the content can be decodable.

Examples disclosed herein provide a video coding structure that reduces the temporal dependency to a minimum amount and that provides a low latency viewport switch solution for immersive video viewport-dependent streaming. Examples disclosed herein simplify the delivery architecture of MPEG-I OMAF standards by encoding a frame to have a spatially dependent layer and a base layer, where frames in the spatially dependent layer depend spatially on the base layer but do not depend temporally on previous frames in the spatially dependent layer. In examples disclosed herein an encoder is configured to realize a uniform tile size/region across a frame (e.g., projected picture) and encode the tiles at different resolutions. For example, some methods, apparatus, and systems disclosed herein segment the frame into equal isolated regions and encode the regions at two or more different resolutions, generating the frames in the base layer and the frames in the spatially dependent layer.

Examples disclosed herein obtain encoded frames and identify parts of the frames to extract for a particular field of view (FOV) based on information from a client. Examples disclosed herein extract and repackage frames from the spatially dependent layer based on the FOV. The encoded frames in the base layer are not extracted for a particular FOV. Examples disclosed herein associate the extracted and repackaged frames in the spatially dependent layer with corresponding frames in the base layer and transmit the associated frames as a bitstream to the client. Examples disclosed herein improve the latency issue in viewport-dependent streaming by removing the temporal dependency between frames in the spatially dependent layer while still facilitating viewport switching.

FIG. 1 is a block diagram of an example video coding process 100 and a viewport-dependent distribution process to deliver immersive video in a time-sensitive (e.g., low latency) manner. The example video coding process 100 includes an example media provider processing side 102, an example server processing side 104, an example network transmitting side 106, and an example client processing side 108. The example media provider processing side 102 implements example encoding circuitry 110. The example server processing side 104 implements an example distribution server 112. The example client processing side 108 implements an example client device 114.

In FIG. 1, the example media provider processing side 102 implements a first phase in the video coding process 100 to encode media, such as example immersive video, requested by the example client device 114. In this example, the media provider processing side 102 occurs at a media provider, such as a specific media provider server that includes and/or stores a plurality of media. In some examples, media may be immersive video. Additionally and/or alternatively, media may be any type of audio and/or video requested by the client device 114.

The media provider processing side 102 implements the encoding circuitry 110 to encode the immersive video into a first bitstream 116 and provide the first bitstream 116 to the example server processing side 104. In this example, the first bitstream 116 is a sequence of bits generated by encoding (e.g., projecting, packing, and encoding) a sequence of frames corresponding to the entire 360 degree view. The example encoding circuitry 110 implements MPEG-I OMAF standard to encode media, such as immersive video. Additionally and/or alternatively, the encoding circuitry 110 may utilize any type of video coding standard to encode media. In some examples, the encoding circuitry 110 obtains configuration instructions from the server processing side 104 indicative of how to encode immersive video. For example, the encoding circuitry 110 is configured to encode immersive video such that the encoded immersive video (e.g., the first bitstream 116) can be efficiently processed and rewritten by the server processing side 104 that is implementing low latency viewport-dependent streaming. Example configuration instructions are described in further detail below in connection with FIGS. 1 and 5.

In FIG. 1, the example server processing side 104 implements a second phase in the video coding process 100 to rewrite bitstreams from the media provider processing side 102 (e.g., bitstream 116). In some examples, the second phase in the video coding process 100 is a viewport-dependent streaming phase. For example, the server processing side 104 rewrites bitstreams from the media provider processing side 102 into new bitstreams indicative of a FOV of the immersive video.

The example server processing side 104 includes the example distribution server 112 to rewrite bitstreams from the media provider processing side 102 (e.g., bitstream 116) into new bitstreams indicative of a FOV. The example distribution server 112 generates configuration instructions for the example encoding circuitry 110 indicative of specific encoding tasks for the example encoding circuitry 110 to complete during generation of the first bitstream 116. In some examples, the configuration instructions enable the distribution server 112 to rewrite the first bitstream 116 into a second bitstream 118 that is indicative of a FOV and that can be decoded efficiently, regardless of a viewport switch. In some examples, the distribution server 112 obtains example FOV parameters 120 from the client processing side 108. The example distribution server 112 may utilize the FOV parameters 120 to identify sections (e.g., tiles, isolated regions, etc.) of the encoded media to extract and package into the second bitstream 118. In this example, the second bitstream 118 is a sequence of bits generated by encoding (e.g., projecting, packing, and encoding) a sequence of frames corresponding to a particular section and/or view in the entire 360 degree view. The example distribution server 112 is described in further detail below in connection with FIG. 3.

In some examples, the distribution server 112 includes means for rewriting a bitstream. For example, the means for rewriting may be implemented by server circuitry 112. In some examples, the server circuitry 112 may be implemented by machine executable instructions such as that implemented by at least blocks 502, 504, 506, and 508 of FIG. 5, blocks 602, 604, 606, and 608 of FIG. 6, and/or blocks 702, 704, 706, 708, 710, 712, and/or 714 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the server circuitry 112 is implemented by other hardware logic circuitry, hardware implemented state machines, and/or any other combination of hardware, software, and/or firmware. For example, the server circuitry 112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In FIG. 1, the example network transmitting side 106 implements a third phase in the video coding process 100 to communicate information between the distribution server 112 and the client device 114. In some examples, the network transmitting side 106 is implemented by the Internet. For example, the distribution server 112 and the client device 114 may be connected via a network, such as the Internet. Additionally and/or alternatively, the example network transmitting side 106 may be implemented by a hardwired connection, a short-range wireless connection (e.g., Bluetooth®), etc. The example network transmitting side 106 transmits FOV parameters 120 to the example distribution server 112 and transmits FOV bitstreams (e.g., the second bitstream 118) to the example client device 114.

In FIG. 1, the example client processing side 108 implements a fourth phase in the video coding process 100 to decode bitstreams from the server processing side 104. The example client processing side 108 includes the client device 114 to decode bitstreams (e.g., the second bitstream 118) from the distribution server 112. In this example, the client device 114 is an extended reality headset. Additionally and/or alternatively, the example client device 114 may be a television, a smart phone, a computer (e.g., a laptop, desktop, tablet, etc.) and/or any type of computing device having the capabilities to stream and/or display immersive video. In some examples, the FOV parameters 120 are subject to change based on the client device 114. In some examples, when a FOV parameter changes, a viewport switch is to occur. In some examples, the viewport switch occurs at the client device 114 instead of the distribution server 112. For example, the second bitstream 118 includes information that enables the client device 114 to decode a new FOV that was not originally used to generate the second bitstream 118. The information in the second bitstream 118 is described in further detail below in connection with FIGS. 2, 3, and 7.

In FIG. 1, the example client device 114 may generate FOV parameters 120 that are values (e.g., angles) representative of a region and/or location a spherical surface, representative of the 360 degree video, which is projected to a two-dimensional plan (e.g., a 2D ERP, a CubeMap projection). The FOV parameters 120 include yaw, pitch, and roll rotation angles. The yaw, pitch, and roll rotation angles are angles about an X-, Y-, and Z-axis, respectively in the spherical surface. In some examples, the client device 114 determines the yaw, pitch, and roll rotation angles based on one or more sensors monitoring movement of the client device 114. The example distribution server 112 utilizes the yaw, pitch, and rotation angles to determine a region in the two-dimensional plane, representative of the immersive video, to generate the second bitstream 118. The example client device 114 can utilize the FOV parameters 120 to subsequently identify a FOV to decode from the second bitstream 118.

Reducing interactive latency between the server processing side 104 and the client processing side 108 reduces the likelihood that delayed or misplaced views at the client processing side 108 can be detected by the human eye. In some examples, to avoid detection of delayed views and give a user completely immersive experiences, the interactive latency between the server 112 and the client 114 should be kept to approximately 25 milliseconds (ms). To determine a total latency between the server 112 and client 114, the total latency computation is broken into three different parts: server processing time, network transport time (in both directions), and client processing time.

In some examples, network transport time, occurring at the network transmitting side 106, is determined by a network architecture and distance between the server 112 and client 114. The network transport time is to be reduced with modern network infrastructure, such as 5G wireless technology standard and Edge computing.

In some examples, the client processing time, occurring at the client processing side 108, is determined by how long it takes the client device 114 to decode and render immersive video. In some examples, the amount of time is dependent on the type of hardware implemented by the client device 114 and the different hardware configurations available to the client device 114. In some examples, based on the client processing time is to be reduced with improved processors, such as multi-core CPUs, GPU, and other accelerators.

In some examples, the server processing time, occurring at the server processing side 104, is determined based on a group of pictures (GOP) size. In this example, a GOP can be explained as follows. Key pictures, such as I-frames and/or P-frames (described in further detail below in connection with FIG. 2), are coded at regular intervals by using previous key pictures as references. The pictures between two key pictures are hierarchically predicted and together, with the succeeding key picture, are known as a GOP. The sequence of key pictures represents a lowest temporal and spatial (e.g., a temporal base layer) coded picture group, which can be increased with non-key pictures that are divided into one or more enhanced layers (e.g., layers having a different resolution than the base layer). The layers in a video coding structure are described in further detail below in connection with FIG. 2.

The greater the GOP, the longer the server processing time. For example, when the server 112 obtains a new viewport and/or a viewport change from the client 114, the server 112 is to wait to generate a FOV for immersive video until a key picture (e.g., an I-frame) is obtained from the media provider processing side 102. The average waiting time for a key picture, when a GOP of size 30 in a 30 frames per second (FPS) video stream, is approximately 500 ms, which is well beyond the amount of latency required for a user to have a fully immersive experience. For example, the average wait time can be determined by dividing 1 second by 2, resulting in 500 ms. The average waiting time can be considered as a uniform distribution within (0, GOP/FPS). Therefore, the example distribution server 112 implements a method to reduce the GOP size in coded video by removing temporal redundancy in the enhanced layers of the video coding structure.

In an example operation of the video coding process 100, the example encoding circuitry 110, at the media providing processing side 102, obtains a request and configuration instructions from the example distribution server 112 at the server processing side 104. The request is indicative of media (e.g., immersive video) to stream to the client device 114 and the configuration instructions are indicative of how to encode to the media (e.g., immersive video) that is to be streamed to the client device 114. The example encoding circuitry 110 encodes the media (e.g., immersive video) and packages the encoded media into a first bitstream 116. The first bitstream 116 is indicative of a full 360 degree frame in the immersive video. The example encoding circuitry 110 transmits the first bitstream 116 to the example distribution server 112 at the server processing side 104.

The example distribution server 112 rewrites the first bitstream 116 into a second bitstream 118 that is indicative of a viewport and/or FOV of the full 360 degree image. The example distribution server 112 generates the second bitstream 118 based on FOV parameters 120 obtained from the client device 114 at the client processing side 108. For example, the distribution server 112 extracts sections (e.g., tiles, isolated regions, etc.), indicative of the FOV parameters 120, from a high-resolution encoded image included in the first bitstream 116. In this example, the distribution server 112 associates a low-resolution encoded image, included in the first bitstream 116 and representative of the full 360 degree image, with the extracted sections of the high-resolution encoded image included in the first bitstream 116 to generate the second bitstream 118. The example distribution server 112 transmits the second bitstream 118, utilizing the network transmitting side 106, to the example client device 114 at the client processing side 108.

The example client device 114 obtains and decodes the second bitstream 118. In some examples, the client device 114 renders the image and/or video in the decoded second bitstream 118. When the example client device 114 detects a viewport switch, the example client device 114 utilizes the low-resolution encoded image in the second bitstream 118 to decode the new FOV. In this manner, the client device 114 does not need to wait on the distribution server 112 to encode and transmit a new bitstream with the new FOV.

Figure 2:
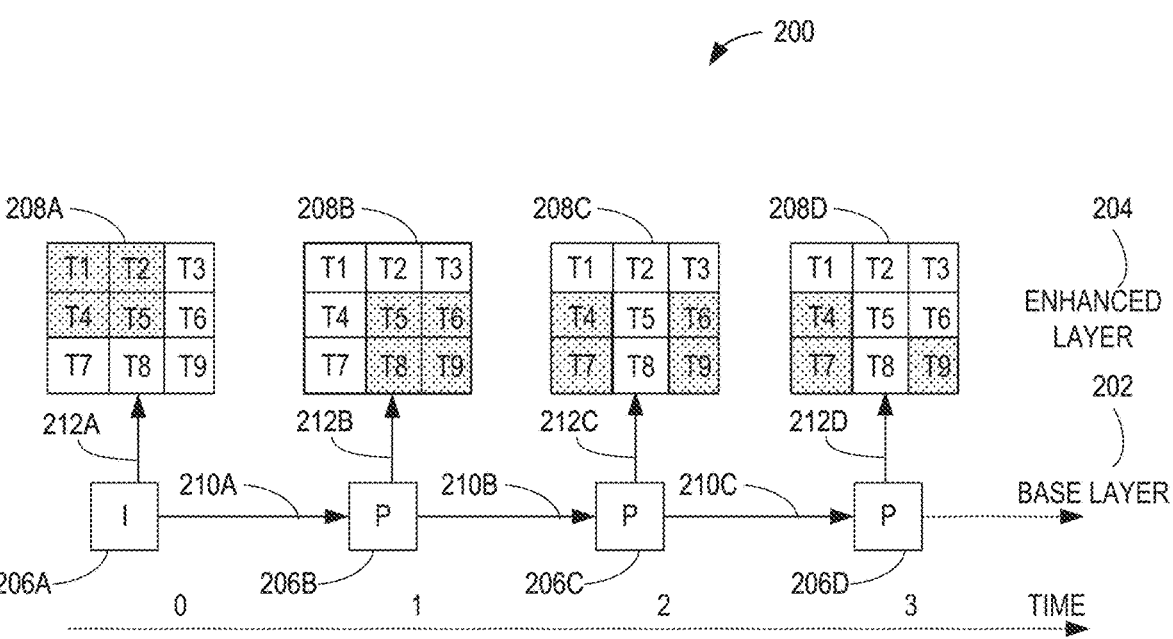
FIG. 2 is an example video coding structure implemented by an example distribution server included in FIG. 1.

FIG. 2 is an example video coding structure 200 implemented by the example distribution server 112 of FIG. 1. The example video coding structure 200 is representative of a viewport-dependent bitstream (e.g., the second bitstream 118 of FIG. 1) generated by the example distribution server 112. The video coding structure 200 includes an example first layer 202 and an example second layer 204. The example first layer 202 includes example first frames 206A, 206B, 206C, and 206D, collectively first frames 206, and the example second layer 204 includes example second frames 208A, 208B, 208C, and 208D, collectively second frames 208.

In FIG. 2, the example first and second frames 206, 208 are encoded pictures provided by the example encoding circuitry 110 of FIG. 1. In some examples, a first one of the first frames 206A is an I-frame. An I-frame, also referred to as intra-coded picture, is a complete image, like a JPEG and/or a BMP image file. An I-frame does not require other information from other video frames to be decoded. In some examples, a second one of the first frames 206B is a P-frame. A P-frame, also referred to as a predicted picture, is a frame that includes changes in the image from the previous frame (e.g., the I-frame 206A). A P-frame can utilize data from previous frames to decompress and a P-frame is more compressible than an I-frame. In some examples, a first one of the second frames 208A is a high-resolution version of the first one of the first frames 206A. For example, to generate the first one of the second frames 208A, the encoding circuitry 110 encodes the first one of the first frames 206A at a higher resolution. Similarly, in some examples, a second one of the second frames 208B is a high-resolution version of the second one of the first frames 206B. For example, the encoding circuitry 110 generates the second one of the second frames 208B by encoding the second one of the first frames 206B at a higher resolution.

In FIG. 2, the example first layer 202 is a base layer and the example second layer 204 is an enhanced layer. For example, the first layer 202 includes first frames 206 encoded at a lower resolution than the second frames 208 in the second layer 204, as mentioned above. In some examples, the video coding structure 200 may include third, fourth, fifth, etc., layers and is not limited to two layers.

In FIG. 2, the example first layer 202 includes temporal dependencies 210A, 210B, and 210C, collectively temporal dependency 210. For example, first frames 206 in the first layer 202 are temporally dependent on one another. For example, the second one of the first frames 206B is temporally dependent on the first one of the first frames 206A, indicated by a first temporal dependency 210A, a third one of the first frames 206C is temporally dependent on the second one of the first frames 206B, indicated by a second temporal dependency 210B, and a fourth one of the first frames 206D is temporally dependent on the third one of the first frames 206C, indicated by a third temporal dependency 210C. Temporal dependency, also referred to as temporal redundancy, is when pixels in two video frames have the same values in the same location. For example, pixels in the second one of the first frames 206B may have the same value and location as pixels in the first one of the first frames 206A. In some examples, the encoding circuitry 110 is configured, utilizing the configuration instructions from the distribution server 112, to build the first layer 202 with temporal dependencies.

In FIG. 2, the second layer 204 includes spatial dependencies 212A, 212B, 212C, and 212D, collectively spatial dependency 212. For example, the second frames 208 are spatially dependent on the first frames 206. For example, the first one of the second frames 208A is spatially dependent on the first one of the first frames 206A, indicated by a first spatial dependency 212A, the second one of the second frames 208B is spatially dependent on the second one of the first frames 206B, indicated by a second spatial dependency 212B, a third one of the second frames 208C is spatially dependent on the third one of the first frames 206C, indicated by a third spatial dependency 212C, and a fourth one of the second frames 208D is spatially dependent on the fourth one of the first frames 206D, indicated by a fourth spatial dependency 212D. Spatial dependency, also referred to as spatial redundancy, is when elements are duplicated within a structure, such as pixels in a still image and bit patterns in a file. For example, pixels in the first one of the first frames 206A are duplicated in the first one of the second frames 208A. As such, the first one of the second frames 208A is a replica of the first one of the first frames 206A but is encoded at a higher resolution. In some examples, the encoding circuitry 110 is configured, utilizing the configuration instructions from the distribution server 112, to build the second layer 204 from the first layer 202 with only spatial dependency. The encoding circuitry 110 does not build the second layer 204 with temporal dependencies.

In FIG. 2, the example first and second frames 206, 208 are encoded into tiles. For example, the encoding circuitry 110 identifies dimensions and segments a projected picture (e.g., a video frame) into tiles. In FIG. 2, the second frames 208 include tiles T1, T2, T3, T4, T5, T6, T7, T8, and T9. The example first frames 206 also include tiles T1, T2, T3, T4, T5, T6, T7, T8, and T9 (not shown). The tiles in the second frames 208 are encoded at a higher resolution than the tiles in the first frames 206. In some examples, the distribution server 112 provides configuration instructions to the encoding circuitry 110 to segment frames into tiles and encode the tiles at different resolutions.

In FIG. 2, the tiles T1, T2, T3, T4, T5, T6, T7, T8, and T9 in the second frames 208 are representative of a full, flattened (e.g., projected) frame in an immersive video. For example, the tiles T1, T2, T3, T4, T5, T6, T7, T8, and T9 may include pixels that make up a sphere signal that has been rectilinearly projected into six square faces and laid out to form a rectangle with a 3:2 ratio of width versus height, with some of the faces rotated to maximize continuity across face edges.

In FIG. 2, the first one of the second frames 208A include shaded tiles T1, T2, T4, and T5. The shaded tiles are indicative of a viewport. For example, out of all the tiles T1, T2, T3, T4, T5, T6, T7, T8, T9, defining the full video frame, the shaded tiles T1, T2, T4, and T5 define a FOV for which a user of the client device 114 may be currently viewing. In the second one of the second frames 208B, the viewport has changed from the viewport of the first one of the second frames 208A. For example, the second one of the second frames 208B includes shaded tiles T5, T6, T8, and T9 which define a new FOV. The third one of the second frames 208C includes a viewport that is different than first and second ones of the second frames 208A, 208B. For example, the third one of the second frames 208C includes shaded tiles T4, T7, T6, and T9 which defined the different FOV. The fourth one of the second frames 208D includes a viewport that is different than the first, second, and third ones of the second frames 208A, 208B, and 208C. For example, the fourth one of the second frames 208D includes shaded tiles T4, T7, and T9 which define the different FOV.

The example distribution server 112 generates the second bitstream 118 (FIG. 2) by extracting the tiles, corresponding to the FOV, from the second frames 208 and repackaging them into new frames that will be grouped together in the second bitstream 118. The example distribution server 112 does not extract FOV tiles from the first frames 206. The example distribution server 112 associates the new frames with respective first frames to generate the final bitstream (e.g., the second bitstream 118) to send to the client device 114.

Advantageously, the video coding structure 200 saves bandwidth in the network transmitting side 106 (FIG. 1) by ensuring that only the high-quality tiles within the FOV will be transmitted. Advantageously, the video coding structure 200 makes it possible for the client device 114 to switch to any tiles in the second layer 204 (e.g., the enhanced layer) at any time due to the elimination of temporal redundancy/dependency in the second layer 204. Advantageously, the video coding structure 200 enables decoding of incontiguous regions (e.g., incontiguous tiles, such as the FOV tiles in the third and fourth ones of the second frames 208C and 208D) in a frame for a given FOV.

Figure 3:
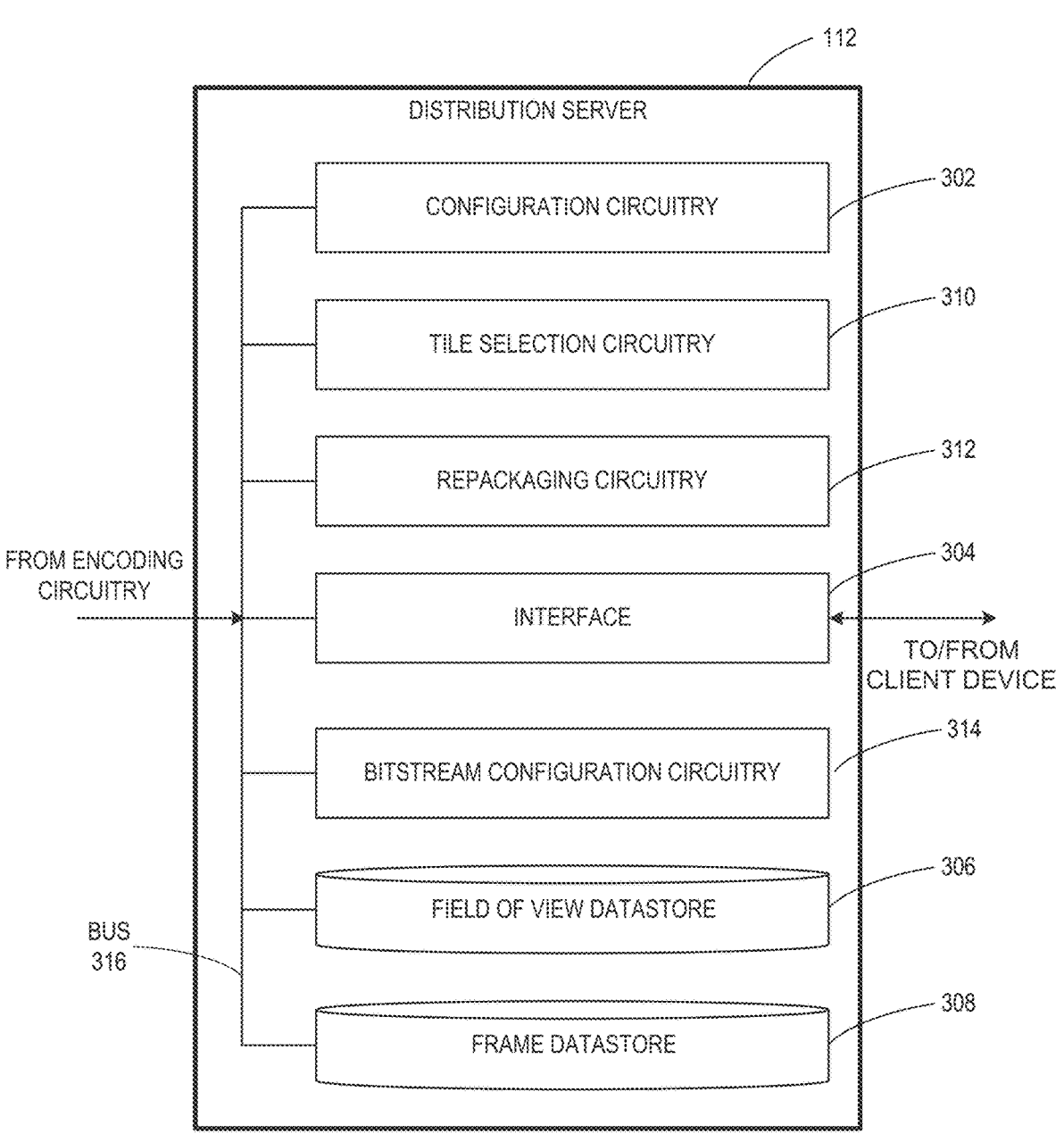
FIG. 3 is a block diagram of the example distribution server of FIG. 1 to rewrite bitstreams for a given FOV.

FIG. 3 is a block diagram of the example distribution server 112 of FIG. 1 to rewrite bitstreams for a given FOV. The example distribution server 112 includes example configuration circuitry 302, an example interface 304, an example field of view (FOV) datastore 306, an example frame datastore 308, example tile selection circuitry 310, example repackaging circuitry 312, and example bitstream configuration circuitry 314.

In FIG. 3, the example configuration circuitry 302 generates instructions, such as configuration instructions, that are to provide encoding circuitry (e.g., the encoding circuitry 110 of FIG. 1) with information on how to process and encode immersive video. The example configuration circuitry 302 generates first instructions that are to configure encoding circuitry to encode projected pictures as groups of tiles, the first instructions to define at least two resolutions for the groups of tiles. For example, the first instructions may cause the encoding circuitry to tile a projected picture at a first resolution and a second resolution, where the first resolution is lower than the second resolution. The first instructions cause the encoding circuitry to segment the projected picture encoded at the first resolution into rows and columns of tiles equal to a number of rows and columns of tiles that segment the projected picture encoded at the second resolution. In some examples, the tiles encoded at the first resolution have a size that is proportional to a size of the tiles encoded at the second resolution. For example, a first projected picture may be encoded at an 8K resolution (e.g., 8,000 pixel) and a second projected picture may be encoded at a 4K resolution (e.g., 4,000 pixels). The first projected picture and the second projected picture are segmented into an equal number of rows and columns and, thus, the each tile in the first projected picture will have 4 times the amount of pixels as each tile in the second projected picture (e.g., a tile ratio of 1:4).

The example configuration circuitry 302 generates second instructions that are to configure the encoding circuitry to build a second layer of groups of tiles, corresponding to one of the at least two resolutions, without temporal dependency. For example, the configuration circuitry 302 causes the encoding circuitry to eliminate temporal dependency between groups of tiles encoded at a higher resolution (e.g., between second frames 208 of FIG. 2). As used herein, a group of tiles is a frame of immersive video that has been encoded into segments. In some examples, a group of tiles may be referred to as a frame. For example, the first one of the second frames 208A in FIG. 2 illustrates the frame 208A made up of a group of tiles.

In some examples, the configuration circuitry 302 provides instructions to encoding circuitry via the interface 304. For example, the configuration circuitry 302 is communicatively coupled to the interface 304 via example bus 316. Therefore, the example configuration circuitry 302 can inform the example interface 304 to package the instructions (e.g., generate a data packet, network packet, etc.) and transmit them to the encoding circuitry. In some examples, the configuration circuitry 302 transmits the first and second instructions in response to a request to utilize viewport-dependent streaming. For example, the interface 304 initializes the configuration circuitry 302 to generate instructions responsive to a notification from a client device (e.g., client device 114 of FIG. 1) that a user wants to stream immersive video.

In some examples, the configuration circuitry 302 includes means for generating configuration instructions. For example, the means for generating instructions may be implemented by configuration circuitry 302. In some examples, the configuration circuitry 302 may be implemented by machine executable instructions such as that implemented by at least blocks 502 and 504 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the configuration circuitry 302 is implemented by other hardware logic circuitry, hardware implemented state machines, and/or any other combination of hardware, software, and/or firmware. For example, the configuration circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In FIG. 3, the example interface 304 communicates information from example encoding circuitry (e.g., encoding circuitry 110 of FIG. 1) and/or an example client device (e.g., client device 114 of FIG. 1). The example interface 304 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. The example interface 304 may obtain requests to utilize viewport-dependent streaming, may transmit configuration instructions, may obtain bitstreams, may transmit bitstreams, may obtain FOV parameters, etc. In some examples, the interface 304 stores communication information in respective datastores (e.g., field of view datastore 306 and/or frame datastore 308).

In some examples, the interface 304 includes means for communicating, means for transmitting, and/or means for obtaining. For example, the means for communicating may be implemented by interface circuitry 304. In some examples, the interface circuitry 304 may be implemented by machine executable instructions such as that implemented by at least blocks 506 and 508 of FIG. 5 and/or blocks 602, 604, and 608 of FIG. 6, executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the interface circuitry 304 is implemented by other hardware logic circuitry, hardware implemented state machines, and/or any other combination of hardware, software, and/or firmware. For example, the interface circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for determining includes means for obtaining field of view information from the client device (e.g., client device 114 of FIG. 1).

In FIG. 3, the example field of view datastore 306 stores and/or records data from client device(s) (e.g., the client device 114 of FIG. 1) and/or the example interface 304. The example field of view datastore 306 includes field of view parameters. The field of view datastore 306 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The field of view datastore 306 may additionally or alternatively be implemented by one or more double data rate (DDR) memories, such as DDR, DDR2, DDR3, DDR4, mobile DDR (mDDR), etc. The field of view datastore 306 may additionally or alternatively be implemented by one or more mass storage devices such as hard disk drive(s), compact disk (CD) drive(s), digital versatile disk (DVD) drive(s), solid-state disk drive(s), etc. While in the illustrated example the field of view datastore 306 is illustrated as a single datastore, the field of view datastore 306 may be implemented by any number and/or type(s) of datastores. Furthermore, the data stored in the field of view datastore 306 may be in any data format such as, for example, binary data, comma delimited data, tab delimited data, structured query language (SQL) structures, etc.

In FIG. 3, the example frame datastore 308 stores and/or records data from encoding circuitry (e.g., the encoding circuitry 110 of FIG. 1), the example tile selection circuitry 310, the example repackaging circuitry 312, the example bitstream configuration circuitry 314, and/or the example interface 304. The example frame datastore 308 includes frame data, groups of tiles data, and/or bitstream data. The frame datastore 308 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The frame datastore 308 may additionally or alternatively be implemented by one or more double data rate (DDR) memories, such as DDR, DDR2, DDR3, DDR4, mobile DDR (mDDR), etc. The frame datastore 308 may additionally or alternatively be implemented by one or more mass storage devices such as hard disk drive(s), compact disk (CD) drive(s), digital versatile disk (DVD) drive(s), solid-state disk drive(s), etc. While in the illustrated example the frame datastore 308 is illustrated as a single datastore, the frame datastore 308 may be implemented by any number and/or type(s) of datastores. Furthermore, the data stored in the frame datastore 308 may be in any data format such as, for example, binary data, comma delimited data, tab delimited data, structured query language (SQL) structures, etc.

In FIG. 3, the example tile selection circuitry 310 is to identify tiles in a group of tiles that correspond to a FOV. The example tile selection circuitry 310 utilizes FOV parameters (e.g., FOV parameter 120 of FIG. 1) to identify which tiles to extract and utilize for generating a second bitstream. For example, the tile selection circuitry 310 identifies a mapping from FOV parameters to a list of tiles which are within a viewer's FOV. In some examples, such as 360 degree video, the FOV parameters are indicative of yaw, pitch, and roll angles. In such an example, the tile selection circuitry 310 maps the angles to a two-dimensional plane (e.g., a 2D ERP, a CubeMap plane, etc.). The yaw, pitch, and roll angles are to determine a region (e.g., a region of tiles) in a spherical surface representative of the 360 degree video, which is projected to the two-dimensional plane (e.g., 2D ERP, a CubeMap plane, etc.). The example tile selection circuitry 310 selects the tiles in the region indicative of the FOV. The tiles selected are tiles in a first encoded frame, the first encoded frame corresponding to a first resolution. In some examples, the first resolution is a high resolution relative to a second encoded frame encoded at a low resolution. As such, the example tile selection circuitry 310 selects tiles from the frame encoded at a higher resolution. As used herein, "resolution" is a term used describe a number of pixels utilized in construction of a frame. Frames having higher resolution are composed with a greater number of pixels than those of lower resolution.

The example tile selection circuitry 310 extracts the selected tiles from the first encoded frame. In some examples, the tile selection circuitry 310 utilizes syntax of a video coding structure (e.g., AV1 scalable video coding (SVC)) to extract the selected tiles. In some examples, the tile selection circuitry 310 separates the tiles, identified as being in the FOV, from the other tiles in the group of tiles corresponding to a whole frame (e.g., the whole 360 degree video frame), according to a video coding structure. For example, the tile selection circuitry 310 may mark and/or flag the tiles not in the FOV as "skipped" tiles, which means these tiles are not to be decoded. Additionally and/or alternatively, the repackaging circuitry 312 and/or the bitstream configuration circuitry 314 marks the unselected tiles as tiles to be "skipped." The example tile selection circuitry 310 provides the selected tiles to the example repackaging circuitry 312.

In some examples, the tile selection circuitry 310 includes means for selecting tiles and/or means for extracting tiles. For example, the means for selecting tiles and/or means for extracting tiles may be implemented by tile selection circuitry 310. In some examples, the tile selection circuitry 310 may be implemented by machine executable instructions such as that implemented by at least blocks 704 and 706 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the tile selection circuitry 310 is implemented by other hardware logic circuitry, hardware implemented state machines, and/or any other combination of hardware, software, and/or firmware. For example, the tile selection circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for determining includes means for selecting ones of tiles corresponding to field of view information to generate an encoded frame.

In FIG. 3, the example repackaging circuitry 312 is to repackage extracted tiles into a third frame, the third encoded frame encoded at the higher resolution and having only the selected tiles representative of the FOV. For example, the repackaging circuitry 312 generates a new frame encoded at the higher resolution that includes only the FOV. In some examples, the repackaging circuitry 312 implements region-wise packing (RWP) to repackage the tiles selected by the tile selection circuitry 310. Additionally and/or alternatively, the example repackaging circuitry 312 may implement any type of algorithm and/or packing standard to repackage the selected tiles.

In some examples, the repackaging circuitry 312 includes means for repackaging tiles. For example, the means for repackaging may be implemented by repackaging circuitry 312. In some examples, the repackaging circuitry 312 may be implemented by machine executable instructions such as that implemented by at least block 708 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the repackaging circuitry 312 is implemented by other hardware logic circuitry, hardware implemented state machines, and/or any other combination of hardware, software, and/or firmware. For example, the repackaging circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In FIG. 3, the example bitstream configuration circuitry 314 is to generate a bitstream corresponding to a FOV. The example bitstream configuration circuitry 314 utilizes the frames, repackaged by the example repackaging circuitry 312, to generate the bitstream. In some examples, the bitstream configuration circuitry 314 implements a video coding structure, such as AV1 SVC, to generate bitstreams. In an example video coding structure, tiles and/or frames are packetized in Open Bitstream Units (OBUs). Each OBU includes a header, which provides information identifying a payload of the bitstream (e.g., the type of information sent in the bitstream, such as an encoded frame). Examples of OBU types that may be present in bitstreams include sequence header OBU, frame header OBU, metadata OBU, temporal delimiter OBU, and tile group OBU. A frame OBU includes a frame header and tile group OBUs packed into one OBU.

In some examples, when a tile is selected by the tile selection circuitry 310, the repackaging circuitry 312 packages one tile into one tile group OBU. In such an example, the repackaging circuitry 312 identifies the frame OBU that the tile group OBU corresponds to and associates the tile group OBU with the frame OBU. After all the tiles in the FOV have been packaged in individual tile group OBUs, the repackaging circuitry 312 associates the tile group OBUs to their respective frame OBU. In some examples, there are multiple frame OBUs in a bitstream. As such, the example bitstream configuration circuitry 314 orders the frame OBUs in a sequence by which they are to be rendered and/or displayed and/or decoded. In some examples, the tile group OBUs include a tile group (tg) start information and a tg end information. The tg start information and the tg end information may be numerical values that indicate where the tiles are in the group of tiles. In some examples, the tg start and tg end information can be used to calculate and/or determine the position of the tiles. In some examples, a position value of a tile is a numerical value corresponding to a position in a total number of tiles in the tile group.

In some examples, two frame OBUs correspond to each other. For example, a frame may be encoded in a first resolution and a second resolution, resulting in two frames. The example bitstream configuration circuitry 314 associates the two frames in the bitstream based on temporal delimiter OBUs. A temporal delimiter OBU is an indication that any following OBUs will have a different presentation/decoding timestamp from a frame prior to the temporal delimiter. The temporal delimiter OBUs associate frames in a first layer with frames in a second layer by indicating that the frame OBUs following a first temporal delimiter OBU and ending at a second temporal delimiter have the same decoding timestamp.

The example bitstream configuration circuitry 314 includes metadata OBUs in the bitstream to map tiles to a position in the frame. For example, the metadata OBUs can be defined to calculate and/or determine the position of the tiles based on the tg start information and tg end information. The example bitstream configuration circuitry 314 generates metadata to determine one or more positions of tiles in the frame encoded at the lower resolution and not defined for a particular FOV. The example bitstream configuration circuitry 314 utilizes the tile positions to enable a decoder (e.g., the client device 114) to 1) skip tiles that do not need to be decoded for a particular FOV and 2) use the skipped tiles when a viewport changes. In some examples, the bitstream configuration circuitry 314 configures the new bitstream (e.g., the FOV bitstream, the second bitstream 118, etc.) to have skippable tiles. Configuring the new bitstream to have skippable tiles may involve setting and/or removing flags in the bitstream that correspond to tile skipping. For example, if the bitstream configuration circuitry 314 implements the AV1 SVC standard, the bitstream configuration circuitry 314 is to, at a frame level, disable a cumulative distribution function (CDF) update and set a global motion vector (MV) flag to zero. The example bitstream configuration circuitry 314 implementing AV1 SVC standard is to, at a tile level, set a transform skip parameter to true and set a "use global MV" flag to true. In different video coding structures, the example bitstream configuration circuitry 314 sets and disables different flags to ensure that the tiles in the lower resolution frame are skippable.

The example bitstream configuration circuitry 314 is to packetize the encoded frame corresponding to the FOV (e.g., the frame group OBU having only tiles in the FOV), the encoded frame corresponding to a lower resolution (e.g., the frame group OBU having all tiles), the temporal delimiters, and the metadata into a new bitstream (e.g., the second bitstream 118). The example bitstream configuration circuitry 314 is to transmit the new bitstream to the client (e.g., the client device 114) to be decoded.

In some examples, the bitstream configuration circuitry 314 includes means for configuring a bitstream. For example, the means for configuring a bitstream may be implemented by bitstream configuration circuitry 314. In some examples, the bitstream configuration circuitry 314 may be implemented by machine executable instructions such as that implemented by at least blocks 710, 712, and 714 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the bitstream configuration circuitry 314 is implemented by other hardware logic circuitry, hardware implemented state machines, and/or any other combination of hardware, software, and/or firmware. For example, the bitstream configuration circuitry 314 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for determining includes means for generating metadata indicative of positions of the tiles to enable the client device (e.g., client device 114 of FIG. 1) to decode a different field of view from encoded frames.

Figure 4:
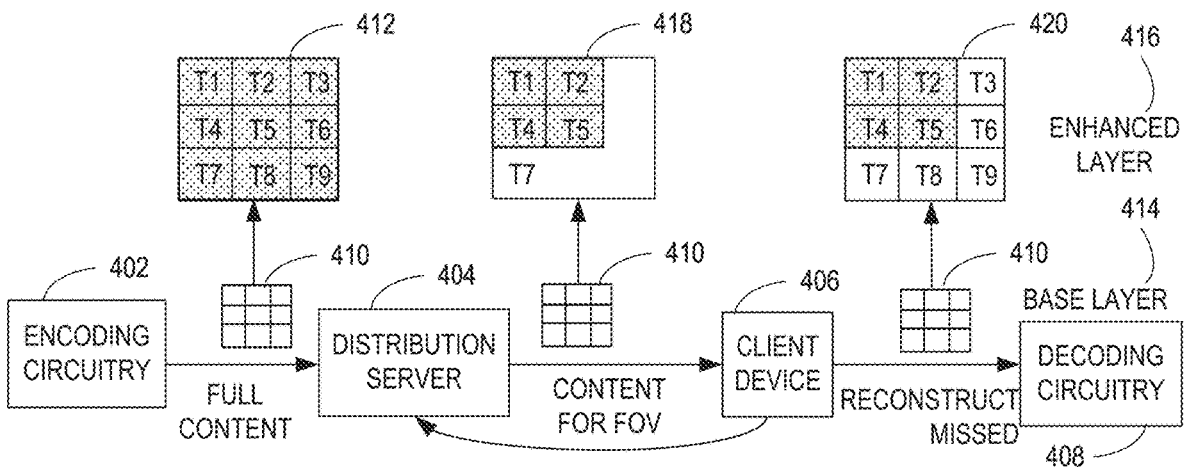
FIG. 4 is a block diagram of an example video coding system to implement bitstream reconfiguration for a given FOV.

FIG. 4 is a block diagram of an example video coding system 400 to implement bitstream reconfiguration. The example video coding system 400 includes example encoding circuitry 402, an example distribution server 404, an example client device 406, and example decoding circuitry 408. In some examples, the encoding circuitry 402 may be implemented by the encoding circuitry 110 of FIG. 1, the example distribution server 404 may be implemented by the example distribution server 112 of FIGS. 1 and 3, and the example client device 406 may be implemented by the example client device 114 of FIG. 1.

In FIG. 4, the example decoding circuitry 408 is to decode bitstreams reconfigured by the example distribution server 404. In some examples, the decoding circuitry 408 is included in the example client device 406. For example, the decoding circuitry 408 may be used internally by the client device 406. Additionally and/or alternatively, the example decoding circuitry 408 may be external to the client device 406. The example decoding circuitry 408 may be implemented at a client processing side, such as the client processing side 108 of FIG. 1.

In an example operation of the video coding system 400, the encoding circuitry 402 encodes a first frame 410 in first resolution and a second frame 412 in a second resolution, greater than the first resolution. The first frame 410 makes up a first layer 414 (e.g., a base layer) and the second frame 412 makes up a second layer 416 (e.g., an enhanced layer). The first frame 410 and the second frame 412 are indicative of a 360 degree picture in video (e.g., a full view of a frame in a 360 degree video). The example encoding circuitry 402 segments the first frame 410 and the second frame 412 into tiles. The second frame 412 includes tiles encoded at a higher resolution than the tiles encoded in the first frame 410. The example encoding circuitry 402 packages the frames 410, 412 into a first bitstream and sends the first bitstream to the example distribution server 404.

In the example operation of the video coding system 400, the example distribution server 404 obtains the first bitstream. The example distribution server 404 obtains FOV information from the example client device 406. The example distribution server 404 reconfigures the first bitstream based on the FOV information.

For example, the distribution server 404 selects tiles in the second frame 412 corresponding to the FOV information. In some examples, the distribution server 404 identifies yaw, pitch, and rotation angles in a spherical surface projected onto a two-dimensional plane. The example distribution server 404 extracts the selected tiles from the second frame 412 to utilize for generating a third frame 418 corresponding to the FOV. The example distribution server 404 repackages the extracted tiles. For example, the distribution server 404 repackages the tiles into separate tile group OBUs. The example distribution server 404 associates the separate tile group OBUs corresponding to the tiles in the third frame 418 with a frame OBU.

In some examples, the distribution server 404 generates metadata to identify one or more positions of tiles in the first frame 410. For example, the distribution server 404 maps tiles in the first frame 410 to positions in the first frame 410. The mapping may be included in the metadata. In some examples, the distribution server 404 makes the tiles in the first frame 410 "skippable" to inform the client device 406 that the tiles do not need to be decoded for that particular FOV. The example distribution server 404 sends the second bitstream to the client device 406.

In the example operation of the video coding system 400, the client device 406 may send the second bitstream to the decoding circuitry 408 for decoding. In some examples, the decoding circuitry 408 may store information indicative of the "skippable" tiles in the first frame 410. In some examples, the decoding circuitry 408 stores the second bitstream for subsequent use when a FOV changes.

For example, the client device 406 determines the FOV changes. In some examples, the client device 406 queries the decoding circuitry 408 for the new FOV. In some examples, the new FOV may correspond to tiles in the second frame 412 that were not selected and used to generate the third frame 418. In such an example, the decoding circuitry 408 utilizes the tile mapping in the metadata of the second bitstream to identify and code tiles not encoded in the third frame 418. The decoding circuitry 408 provides the new FOV to the client device 406 for rendering. Advantageously, the client device 406 does not need to wait on for the distribution server 404 to encode a new frame corresponding to the new FOV.

The example distribution server 404 is to generate a second bitstream utilizing the third frame 418. For example, the distribution server 404 is to While an example manner of implementing the distribution server 112 of FIG. 1 is illustrated in FIGS. 3 and 4, one or more of the elements, processes, and/or devices illustrated in FIGS. 3 and 4 may be combined, divided, re-arranged, omitted, eliminated, and/or implemented in any other way. Further, the example configuration circuitry 302, the example interface 304, the example field of view (FOV) datastore 306, the example frame datastore 308, the example tile selection circuitry 310, the example repackaging circuitry 312, the example bitstream configuration circuitry 314, and/or, more generally, the example distribution server 112 of FIG. 1, may be implemented by hardware, software, firmware, and/or any combination of hardware, software, and/or firmware. Thus, for example, any of the example configuration circuitry 302, the example interface 304, the example field of view (FOV) datastore 306, the example frame datastore 308, the example tile selection circuitry 310, the example repackaging circuitry 312, the example bitstream configuration circuitry 314 and/or, more generally, the example distribution server 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device (s) (PLD(s)), and/or field programmable logic device(s) (FPLD(s)) such as Field Programmable Gate Arrays (FP-GAs). When reading any of the apparatus or system claims of this patent to cover a purely software and/or firmware implementation, at least one of the example configuration circuitry 302, the example interface 304, the example field of view (FOV) datastore 306, the example frame datastore 308, the example tile selection circuitry 310, the example repackaging circuitry 312, and/or the example bitstream configuration circuitry 314 is/are hereby expressly defined to include a non-transitory computer readable storage device or storage disk such as a memory, a digital versatile disk (DVD), a compact disk (CD), a Blu-ray disk, etc., including the software and/or firmware. Further still, the example distribution server 112 of FIG. 1 may include one or more elements, processes, and/or devices in addition to, or instead of, those illustrated in FIGS. 3 and 4, and/or may include more than one of any or all of the illustrated elements, processes and devices.

Figure 6:
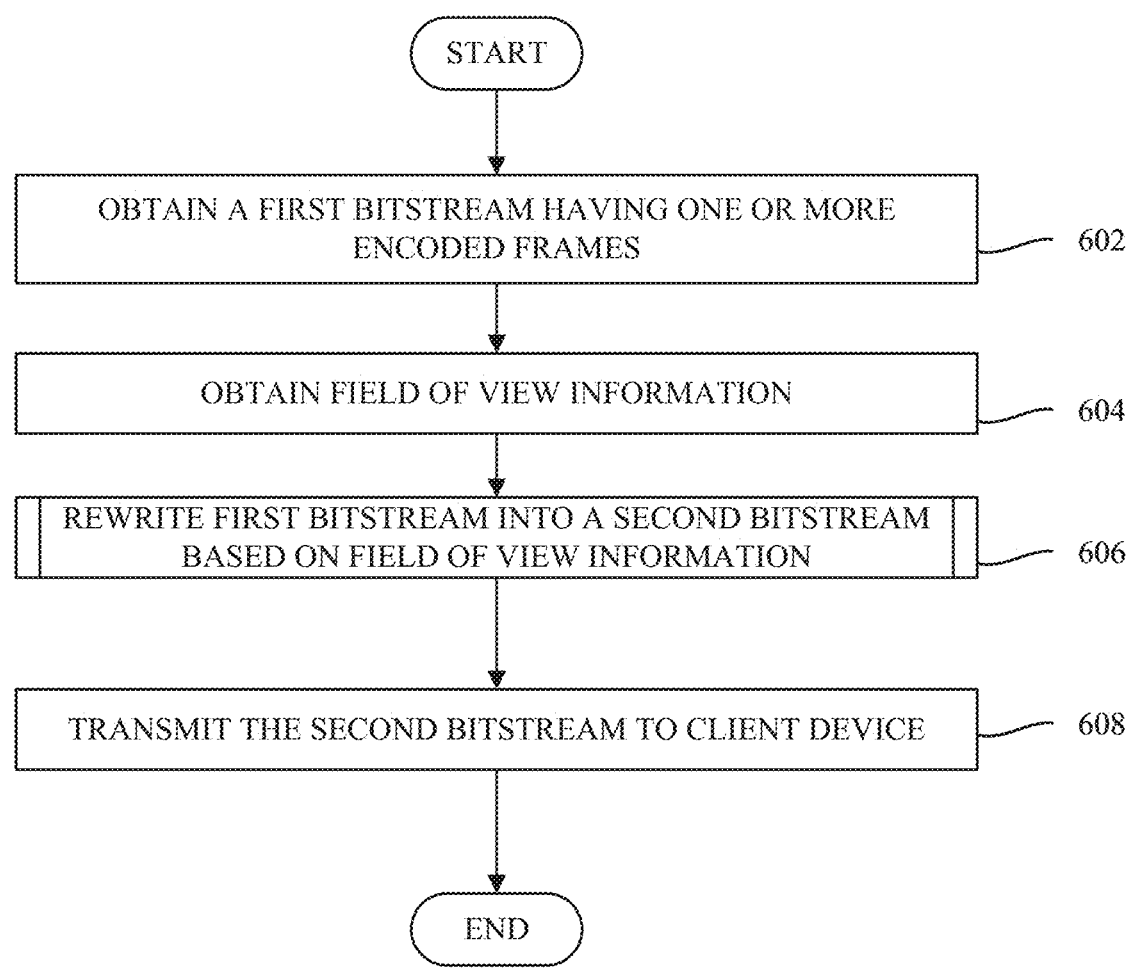

Flowcharts representative of example hardware logic circuitry, machine readable instructions, hardware implemented state machines, and/or any combination thereof for implementing the distribution server 112 of FIGS. 1, 3, and 4 are shown in FIGS. 5-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 5-7, many other methods of implementing the example distribution server 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to generate instructions that are to configure encoding circuitry to encode video in a particular manner. The machine readable instructions and/or operations 500 of FIG. 5 begin at block 502, at which the distribution server 112 generates first instructions to configure encoding circuitry to encode projected pictures as groups of tiles, the first instructions to define at least two resolutions for the groups of tiles. For example, the configuration circuitry 302 generates configuration instructions that cause encoding circuitry (e.g., encoding circuitry 110 of FIG. 1 and/or encoding circuitry 402 of FIG. 4) to tile a projected picture at a first resolution and a second resolution, where the first resolution is lower than the second resolution.

The example distribution server 112 is to generate second instructions to configure the encoding circuitry to build a second layer of groups of tiles, corresponding to one of the at least two resolutions, without temporal dependency (block 504). For example, the configuration circuitry 302 is to cause the encoding circuitry (e.g., encoding circuitry 110 of FIG. 1 and/or encoding circuitry 402 of FIG. 4) to eliminate temporal dependency between groups of tiles encoded at a higher resolution (e.g., between second frames 208 of FIG. 2).

The example distribution server 112 is to wait until a request is obtained to utilize viewport-dependent streaming (block 506). For example, the configuration circuitry 302 is to wait to send first and second instructions to the encoding circuitry (e.g., encoding circuitry 110 of FIG. 1 and/or encoding circuitry 402 of FIG. 4) until a client device (e.g., the client device 114 of FIG. 1 and/or the client device 406 of FIG. 4) requests viewport-dependent streaming services.

When the example distribution server 112 obtains a request to utilize viewport-dependent streaming (e.g., block 506 returns a value YES), the example distribution server 112 transmits the first and second instructions to the encoding circuitry (block 508). For example, the configuration circuitry 302 is to transmit the first and second instructions in response to a request to utilize viewport-dependent streaming. In some examples, the interface 304 initializes the configuration circuitry 302 to generate instructions responsive to a notification from a client device (e.g., client device 114 of FIG. 1 and/or the client device 406 of FIG. 4) that a user wants to stream immersive video.

The example operations 500 end when the example distribution server 112 transmits the first and second instructions. In some examples, the operations 500 may be repeated when different encoding circuitry (e.g., encoding circuitry that has not been configured by the first and second configuration instructions) is utilized in the viewport-dependent streaming process.

FIG. 6 is a flowchart representative of example machine readable instructions and/or example operations 600 that may be executed and/or instantiated by processor circuitry to rewrite bitstreams for viewport-dependent streaming. The machine readable instructions and/or operations 600 of FIG. 6 begin at block 602, at which the distribution server 112 obtains a first bitstream having one or more encoded frames. For example, the interface 304 obtains the first bitstream from encoding circuitry (e.g., encoding circuitry 110 of FIG. 1 and/or encoding circuitry 402 of FIG. 4), the first bitstream corresponding to a sequence of frames indicative of an entire 360 degree view of immersive video. The sequence of frames are encoded at a first resolution and a second resolution, the second resolution higher than the first resolution. Each of the frames encoded at the second resolution do not include temporal dependency on any respective subsequent or previous frames.

The example distribution server 112 is to obtain field of view (FOV) information (block 604). For example, the interface 304 is to obtain yaw, pitch, and roll rotation angles from a client device (e.g., client device 114 of FIG. 1 and/or the client device 406 of FIG. 4) corresponding to a FOV.

The example distribution server 112 is to rewrite the first bitstream into a second bitstream based on the field of view (FOV) information (block 606). For example, the tile selection circuitry 310, the repackaging circuitry 312, and the bitstream configuration circuitry 314 are to generate a sequence of bits by encoding (e.g., projecting, packing, and encoding) a sequence of frames corresponding to a particular section and/or view in the entire 360 degree view.

The example distribution server 112 is to transmit the second bitstream to the client device (block 608). For example, the interface 304 is to send the second bitstream to the client device for decoding and rendering. In some examples, the second bitstream can be utilized by the client device in subsequent and/or different views of the 360 degree view.

The example operations 600 end when the example distribution server 112 transmits the second bitstream to the client device. In some examples, the operations 600 are repeated when the encoding circuitry provides a new bitstream of encoded immersive video and/or when the client device provides new FOV information.

FIG. 7 is a flowchart representative of example machine readable instructions and/or example operations 606 that may be executed and/or instantiated by processor circuitry to rewrite the first bitstream into a second bitstream based on FOV information. The machine readable instructions and/or operations 606 of FIG. 7 begin at block 702, at which the distribution server 112 is to select tiles in a first encoded frame corresponding to the field of view, the first encoded frame corresponding to a first resolution. For example, the tile selection circuitry 310 is to utilize FOV information to identify which tiles to extract and utilize for generating a second bitstream.

The example distribution server 112 is to extract selected tiles from the first encoded frame (block 704). For example, the tile selection circuitry 310 is to utilize syntax of a video coding structure (e.g., AV1 scalable video coding (SVC)) to extract the selected tiles. In some examples, the tile selection circuitry 310 separates the tiles, identified as being in the FOV, from the other tiles in the group of tiles corresponding to a whole frame (e.g., the whole 360 degree video frame), according to a video coding structure.

The example distribution server 112 is to repackage the extracted tiles into a second encoded frame, the second encoded frame encoded at the first resolution and having only the selected tiles representative of the field of view (block 706). For example, the repackaging circuitry 312 is to generate a new frame encoded at the higher resolution that includes only the FOV. In some examples, the repackaging circuitry 312 is to package one tile into one tile group (e.g., tile group OBU). When the selected and extracted tiles have been packaged into respective tile groups, the example repackaging circuitry 312 is to package the tile groups into a frame group (e.g., a frame group OBU).

The example distribution server 112 is to insert a temporal delimiter before the second encoded frame and a third encoded frame to associate the frames, the third encoded frame corresponding to a second resolution lower than the first resolution (block 708). For example, the bitstream configuration circuitry 314 is to associate a frame (e.g., the second encoded frame) in a first layer (e.g., the enhanced layer) with a frame (e.g., the third encoded frame) in a second layer (e.g., the base layer) by indicating that the frame OBUs following a first temporal delimiter OBU have the same decoding timestamp. The second encoded frame and the third encoded frame belong to the same frame. For example, the content in the second encoded frame and the third encoded frame is the same, but the content is just encoded at different resolutions. For example, turning to FIG. 2, the first one of the first frames 206A and the first one of the second frames 208A belong to frame 0, as depicted on the timeline. Similarly, the second encoded frame and the third encoded frame belong to the same frame. The temporal delimiters inserted before the second encoded frame and the third encoded frame are to indicate that the second and third encoded frame belong to the same frame.

The example distribution server 112 is to generate metadata to identify one or more positions of tiles in the third encoded frame (block 710). For example, the bitstream configuration circuitry 314 determines a tile group start value and a tile group end value for each tile in the third encoded frame, the start value and end value to be used to determine a position of the tile in the third encoded frame. In some examples, the bitstream configuration circuitry 314 is to include information in the metadata that informs the client device and/or decoding circuitry that the tiles in the third encoded frame are skippable. For example, the bitstream configuration circuitry 314 is to set and/or remove flags in the bitstream that correspond to tile skipping.

The example distribution server 112 is to packetize the second encoded frame, the third encoded frame, the temporal delimiter, and the metadata into a second bitstream (block 712). For example, the bitstream configuration circuitry 314 is to combine the information (e.g., the encoded frames, the temporal delimiter OBUs, the metadata, etc.) into a bitstream packet that can be transmitted over a network (e.g., the Internet).

The example distribution server 112 is to determine whether there is another frame to encode (block 714). For example, the first bitstream may include a number of encoded frames that are to be streamed to a client device (e.g., the client device 114 of FIG. 1). In such an example, each frame is to be segmented based on a FOV and rewritten into the second bitstream. In some examples, if the distribution server 112 determines that there is another frame (e.g., block 714 returns a value YES), control returns to block 702.

In some examples, if the distribution server 112 determines that there is not another frame (e.g., block 714 returns a value NO), control returns to the operations 600, in particular to block 608, when the example distribution server 112 packetizes the information (e.g., second encoded frame, the third encoded frame, the temporal delimiters, and the metadata) into the second bitstream.

Figure 8:
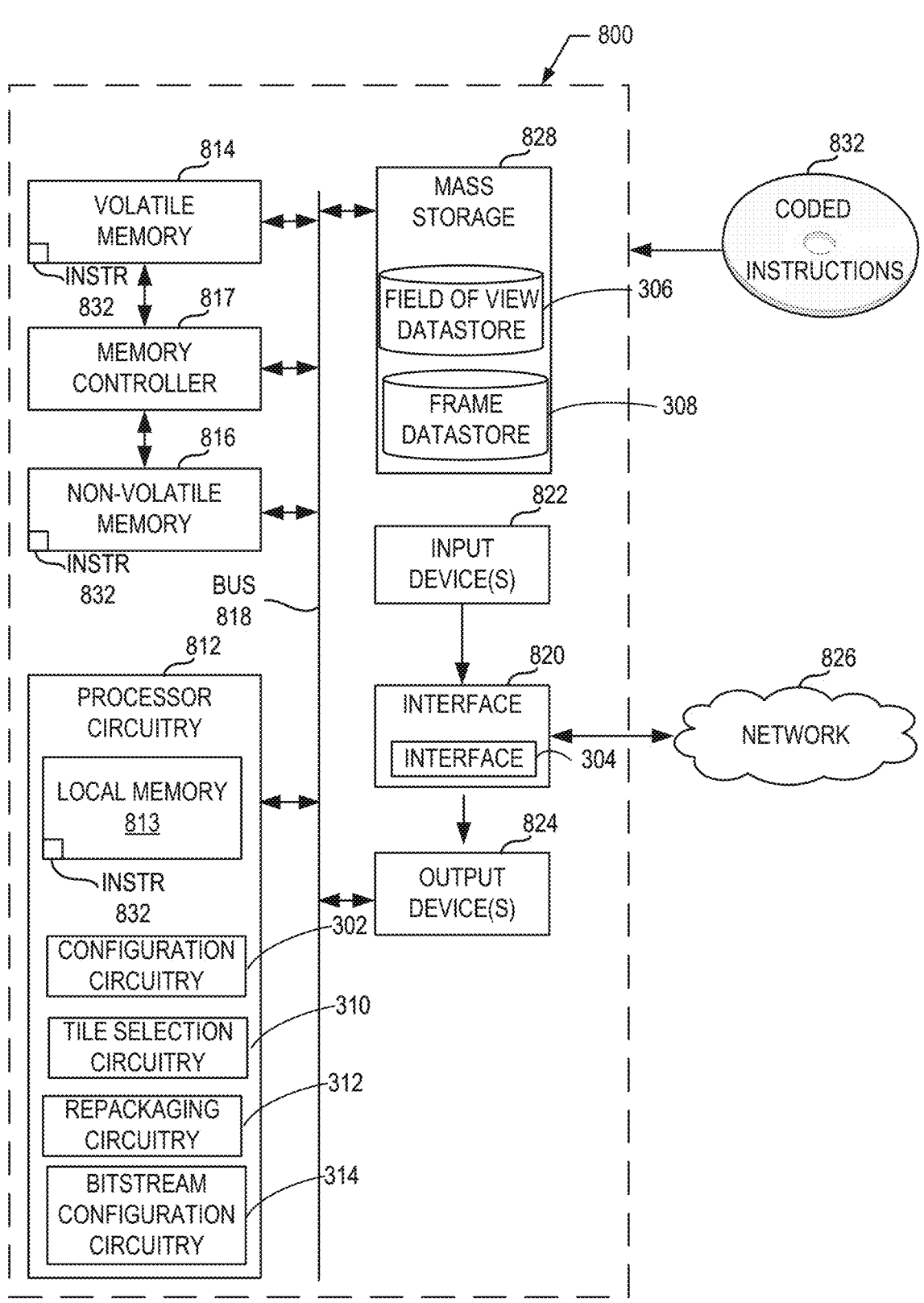
FIG. 8 is a block diagram of an example processing platform including processor circuitry structured to execute the example machine readable instructions of FIGS. 5-7 to implement the distribution server of FIGS. 1 and 3.

FIG. 8 is a block diagram of an example processor platform 800 structured to execute and/or instantiate the machine readable instructions and/or operations of FIGS. 5-7 to implement the distribution server 112 of FIGS. 1 and 3. The processor platform 800 can be, for example, a server, a personal computer, a workstation, a self-learning machine (e.g., a neural network), a mobile device (e.g., a cell phone, a smart phone, a tablet such as an iPad™), an Internet appliance, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example configuration circuitry 302, the example tile selection circuitry 310, the example repackaging circuitry 312, and the example bitstream configuration circuitry 314.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In this example, the interface circuitry 820 implements the example interface 304.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or a tactile output device. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives. In this example, the mass storage devices 828 may implement the example field of view datastore 306 and the frame datastore 308.

The machine executable instructions 832, which may be implemented by the machine readable instructions of FIGS. 5-7, may be stored in the mass storage device 828, in the volatile memory 814, in the non-volatile memory 816, and/or on a removable non-transitory computer readable storage medium such as a CD or DVD.

Figure 9:
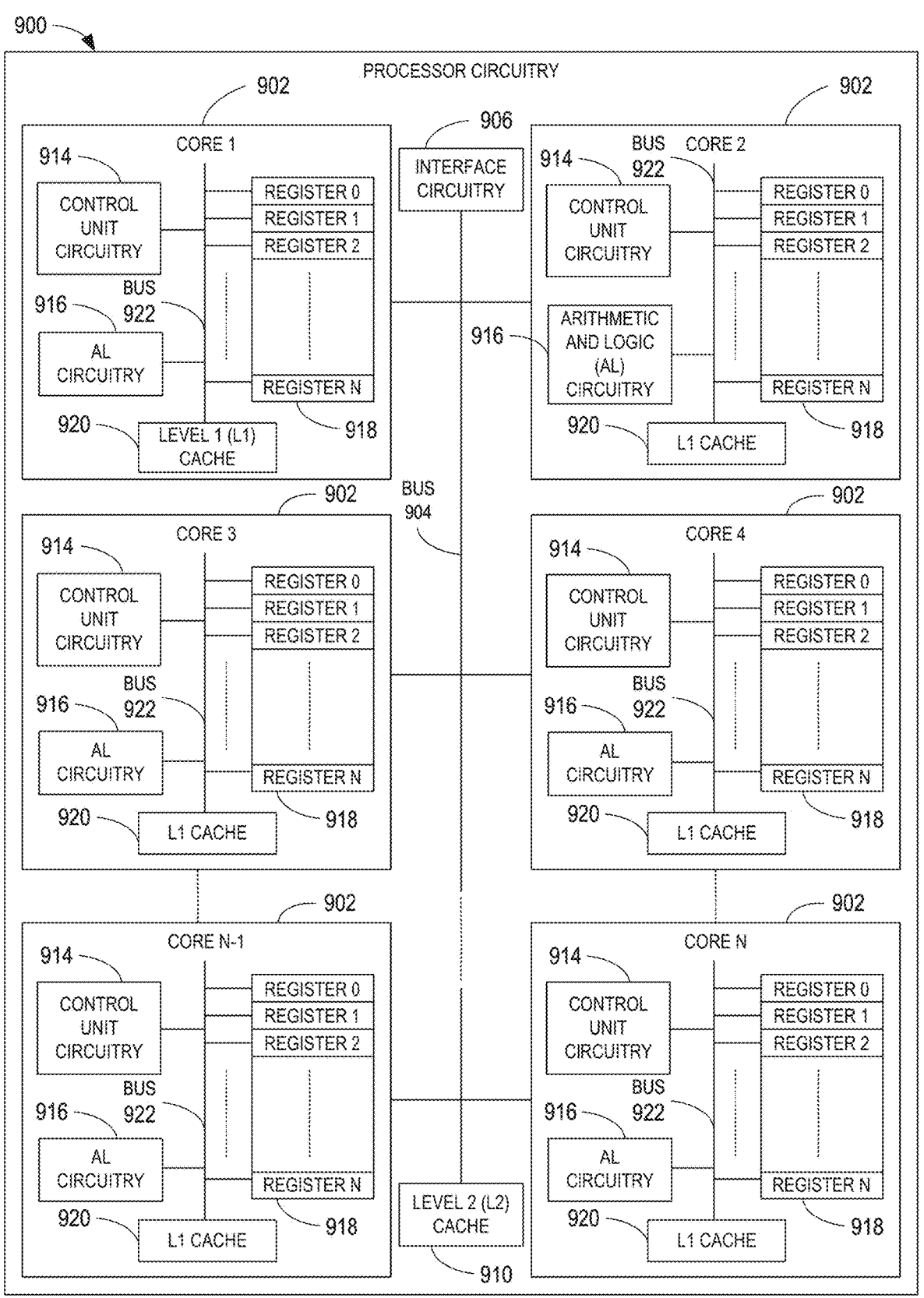
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIGS. 5-7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 904 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
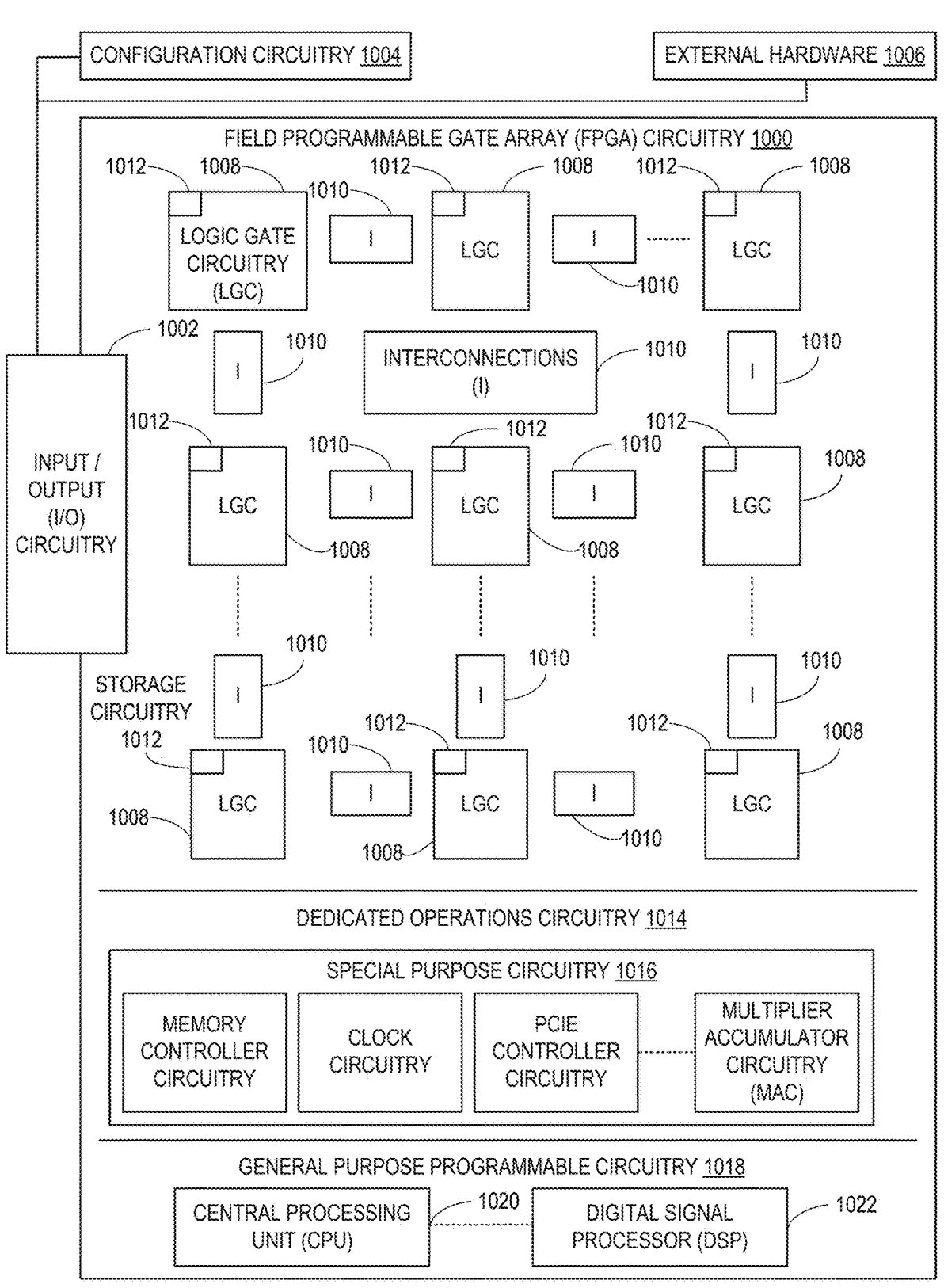
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 5-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIG. 5-7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIG. 5-7. As such, the FPGA circuitry 1000 may be structured to effectively instantiate some or all of the machine readable instructions of the flowcharts of FIGS. 5-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 5-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 5-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIGS. 5-7 may be executed by one or more of the cores 902 of FIG. 9 and a second portion of the machine readable instructions represented by the flowcharts of FIGS. 5-7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that improve and/or reduce latency in viewport switching. Examples disclosed herein save bandwidth between a client device and a distribution server that distributes immersive video to the client device by ensuring that only high-quality tiles of frames within the FOV will be transmitted. Examples disclosed herein remove temporal redundancy and/or dependency between encoded frames in an enhanced layer (e.g., in the high-quality layer) to facilitate a viewport switch of any tiles in the enhanced layer at any time by the client device. Advantageously, examples disclosed herein enable decoding of incontiguous regions (e.g., incontiguous tiles, such as tiles not positioned next to each other but in a FOV) in a frame for a given FOV without a need for the distribution server to provide new video data (e.g., new frames). The disclosed systems, methods, apparatus, and articles of manufacture improve the efficiency of using a computing device by reducing the latency between interactivity of a client and a server during immersive video streaming when a viewport changes. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to reduce latency during viewport switching in immersive video are disclosed herein. Further examples and combinations thereof include the following:

Example 1 includes an apparatus comprising at least one memory, instructions in the apparatus, and processor circuitry to execute the instructions to obtain a first bitstream having a first encoded frame and a second encoded frame, the second encoded frame encoded at a higher resolution than the first encoded frame and having a coding dependency on the first encoded frame, rewrite the first bitstream into a second bitstream based on field of view information, the second bitstream including a third encoded frame indicative of a portion of the second encoded frame that corresponds to the field of view information and including the first encoded frame, and transmit the second bitstream to a client device for decoding and rendering the portion of the second encoded frame.

Example 2 includes the apparatus of example 1, wherein the first encoded frame is segmented into first tiles and the second encoded frame is segmented into second tiles, the first tiles proportional to the second tiles.

Example 3 includes the apparatus of example 2, wherein the processing circuitry is to select ones of the second tiles corresponding to the field of view information to generate the third encoded frame.

Example 4 includes the apparatus of example 1, wherein the coding dependency of the second encoded frame is a spatial coding dependency, the second encoded frame not having a temporal dependency on any subsequent or previous encoded frames included in the first bitstream and encoded at the higher resolution.

Example 5 includes the apparatus of example 1, wherein the first bitstream is indicative of a full 360 degree video frame in an immersive video and the second bitstream is indicative of a portion of the full 360 degree video frame in the immersive video.

Example 6 includes the apparatus of example 1, wherein the processing circuitry is to obtain the field of view information from the client device, the field of view information including yaw, pitch, and roll rotation angles.

Example 7 includes the apparatus of example 1, wherein the first encoded frame is segmented into first tiles and the second encoded frame is segmented into second tiles, the processing circuitry is to select ones of the second tiles corresponding to the field of view information to generate the third encoded frame, and generate metadata indicative of positions of the first tiles to enable the client device to decode a different field of view from the first encoded frame, the different field of view not corresponding to the ones of the second tiles corresponding to the field of view information and not included in the third encoded frame.

Example 8 includes a non-transitory computer readable storage medium comprising instructions that, when executed, cause one or more processors to at least obtain a first bitstream having a first encoded frame and a second encoded frame, the second encoded frame encoded at a higher resolution than the first encoded frame and having a coding dependency on the first encoded frame, rewrite the first bitstream into a second bitstream based on field of view information, the second bitstream including a third encoded frame indicative of a portion of the second encoded frame that corresponds to the field of view information and including the first encoded frame, and transmit the second bitstream to a client device for decoding and rendering the portion of the second encoded frame.

Example 9 includes the non-transitory computer readable storage medium of example 8, wherein the first encoded frame is segmented into first tiles and the second encoded frame is segmented into second tiles, the first tiles proportional to the second tiles.

Example 10 includes the non-transitory computer readable storage medium of example 9, wherein the instructions, when executed, cause the one or more processors to select ones of the second tiles corresponding to the field of view information to generate the third encoded frame.

Example 11 includes the non-transitory computer readable storage medium of example 8, wherein the coding dependency of the second encoded frame is a spatial coding dependency, the second encoded frame not having a temporal dependency on any subsequent or previous encoded frames included in the first bitstream and encoded at the higher resolution.

Example 12 includes the non-transitory computer readable storage medium of example 8, wherein the first bitstream is indicative of a full 360 degree video frame in an immersive video and the second bitstream is indicative of a portion of the full 360 degree video frame in the immersive video.

Example 13 includes the non-transitory computer readable storage medium of example 8, wherein the instructions, when executed, cause the one or more processors to obtain the field of view information from the client device, the field of view information including yaw, pitch, and roll rotation angles.

Example 14 includes the non-transitory computer readable storage medium of example 8, wherein the first encoded frame is segmented into first tiles and the second encoded frame is segmented into second tiles and the instructions, when executed, cause the one or more processors to select ones of the second tiles corresponding to the field of view information to generate the third encoded frame, and generate metadata indicative of positions of the first tiles to enable the client device to decode a different field of view from the first encoded frame, the different field of view not corresponding to the ones of the second tiles corresponding to the field of view information and not included in the third encoded frame.

Example 15 includes a method comprising obtaining a first bitstream having a first encoded frame and a second encoded frame, the second encoded frame encoded at a higher resolution than the first encoded frame and having a coding dependency on the first encoded frame, rewriting the first bitstream into a second bitstream based on field of view information, the second bitstream including a third encoded frame indicative of a portion of the second encoded frame that corresponds to the field of view information and including the first encoded frame, and transmitting the second bitstream to a client device for decoding and rendering the portion of the second encoded frame.

Example 16 includes the method of example 15, wherein the first encoded frame is segmented into first tiles and the second encoded frame is segmented into second tiles, the first tiles proportional to the second tiles.

Example 17 includes the method of example 16, further including selecting ones of the second tiles corresponding to the field of view information to generate the third encoded frame.

Example 18 includes the method of example 15, wherein the coding dependency of the second encoded frame is a spatial coding dependency, the second encoded frame not having a temporal dependency on any subsequent or previous encoded frames included in the first bitstream and encoded at the higher resolution.

Example 19 includes the method of example 15, further including obtaining the field of view information from the client device, the field of view information including yaw, pitch, and roll rotation angles.

Example 20 includes the method of example 15, wherein the first encoded frame is segmented into first tiles and the second encoded frame is segmented into second tiles, the method further including selecting ones of the second tiles corresponding to the field of view information to generate the third encoded frame, and generating metadata indicative of positions of the first tiles to enable the client device to decode a different field of view from the first encoded frame, the different field of view not corresponding to the ones of the second tiles corresponding to the field of view information and not included in the third encoded frame.

Example 21 includes the method of example 15, wherein the first bitstream is indicative of a full 360 degree video frame in an immersive video and the second bitstream is indicative of a portion of the full 360 degree video frame in the immersive video.

Example 22 includes the method of example 15, further including obtaining the field of view information from a client device, the field of view information including yaw, pitch, and roll rotation angles.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:

at least one memory;

instructions in the apparatus; and at least one programmable circuit to be programmed based on the instructions to:

obtain a first bitstream having a first encoded frame and a second encoded frame encoded at a higher resolution than the first encoded frame, the first encoded frame and the second encoded frame both corresponding to an entire view of an immersive video, the second encoded frame having a coding dependency on the first encoded frame;

rewrite the first bitstream into a second bitstream based on field of view information, the second bitstream including the first encoded frame corresponding to the entire view of the immersive video and a third encoded frame corresponding to a portion of the second encoded frame, the portion of the second encoded frame corresponding to a field of view smaller than the entire view, the field of view specified by the field of view information; and cause transmission of the second bitstream to a client device to decode and render the portion of the second encoded frame.

2. The apparatus of claim 1, wherein the first encoded frame is segmented into first tiles and the second encoded frame is segmented into second tiles, the first tiles proportional to the second tiles.

3. The apparatus of claim 2, wherein one or more of the at least one programmable circuit is to select ones of the second tiles corresponding to the field of view information to generate the third encoded frame.

4. The apparatus of claim 1, wherein the coding dependency of the second encoded frame is a spatial coding dependency, the second encoded frame not having a temporal dependency on any subsequent or previous encoded frames included in the first bitstream and encoded at the higher resolution.

5. The apparatus of claim 1, wherein the first bitstream is associated with a full 360 degree video frame in an immersive video and the second bitstream is associated with a portion of the full 360 degree video frame in the immersive video.

6. The apparatus of claim 1, wherein one or more of the at least one programmable circuit is to obtain the field of view information from the client device, the field of view information including yaw, pitch, and roll rotation angles.

7. The apparatus of claim 1, wherein the first encoded frame is segmented into first tiles and the second encoded frame is segmented into second tiles, and one or more of the at least one programmable circuit is to:

select ones of the second tiles corresponding to the field of view information to generate the third encoded frame; and generate metadata to identify positions of the first tiles, the metadata to enable the client device to decode a different field of view from the first encoded frame.

8. A non-transitory computer readable storage medium comprising instructions to cause at least one programmable circuit to at least:

obtain a first bitstream having a first encoded frame and a second encoded frame encoded at a higher resolution than the first encoded frame, the first encoded frame and the second encoded frame both corresponding to an entire view of an immersive video, the second encoded frame having a coding dependency on the first encoded frame;

rewrite the first bitstream into a second bitstream based on field of view information, the second bitstream including the first encoded frame and a third encoded frame, the third encoded frame corresponding to a portion of the second encoded frame, the portion of the second encoded frame corresponding to a field of view smaller than the entire view, the field of view specified by the field of view information; and cause transmission of the second bitstream to a client device to decode and render the portion of the second encoded frame.

9. The non-transitory computer readable storage medium of claim 8, wherein the first encoded frame is segmented into first tiles and the second encoded frame is segmented into second tiles, the first tiles proportional to the second tiles.

10. The non-transitory computer readable storage medium of claim 9, wherein the instructions are to cause one or more of the at least one programmable circuit to select ones of the second tiles corresponding to the field of view information to generate the third encoded frame.

11. The non-transitory computer readable storage medium of claim 8, wherein the coding dependency of the second encoded frame is a spatial coding dependency, the second encoded frame not having a temporal dependency on any subsequent or previous encoded frames included in the first bitstream and encoded at the higher resolution.

12. The non-transitory computer readable storage medium of claim 8, wherein the first bitstream is associated with a full 360 degree video frame in an immersive video and the second bitstream is associated with a portion of the full 360 degree video frame in the immersive video.

13. The non-transitory computer readable storage medium of claim 8, wherein the instructions are to cause one or more of the at least one programmable circuit to obtain the field of view information from the client device, the field of view information including yaw, pitch, and roll rotation angles.

14. The non-transitory computer readable storage medium of claim 8, wherein the first encoded frame is segmented into first tiles and the second encoded frame is segmented into second tiles and the instructions are to cause one or more of the at least one programmable circuit to:

select ones of the second tiles corresponding to the field of view information to generate the third encoded frame; and generate metadata to identify positions of the first tiles, the metadata frame.

15. A method comprising:

obtaining a first bitstream having a first encoded frame and a second encoded frame encoded at a higher resolution than the first encoded frame, the first encoded frame and the second encoded frame both corresponding to an entire view of an immersive video, the second encoded frame having a coding dependency on the first encoded frame;

rewriting the first bitstream into a second bitstream based on field of view information, the second bitstream including the first encoded frame corresponding to the entire view of the immersive video and a third encoded frame corresponding to a portion of the second encoded frame, the portion of the second encoded frame corresponding to a field of view smaller than the entire view, the field of view specified by the field of view information; and transmitting the second bitstream to a client device for decoding and rendering the portion of the second encoded frame.

16. The method of claim 15, wherein the first encoded frame is segmented into first tiles and the second encoded frame is segmented into second tiles, the first tiles proportional to the second tiles.

17. The method of claim 16, including selecting ones of the second tiles corresponding to the field of view information to generate the third encoded frame.

18. The method of claim 15, wherein the coding dependency of the second encoded frame is a spatial coding dependency, the second encoded frame not having a temporal dependency on any subsequent or previous encoded frames included in the first bitstream and encoded at the higher resolution.

19. The method of claim 15, including obtaining the field of view information from the client device, the field of view information including yaw, pitch, and roll rotation angles.

20. The method of claim 15, wherein the first encoded frame is segmented into first tiles and the second encoded frame is segmented into second tiles, and including:

selecting ones of the second tiles corresponding to the field of view information to generate the third encoded frame; and generating metadata to identify positions of the first tiles, the metadata to enable the client device to decode a different field of view from the first encoded frame.

\* \* \* \* \*